(12) United States Patent
Lam et al.

(10) Patent No.: US 8,829,137 B2
(45) Date of Patent: Sep. 9, 2014

(54) POLYETHYLENE FILM

(75) Inventors: Patrick Lam, Calgary (CA); Victoria Ker, Calgary (CA); Charles Ashton Garret Carter, Calgary (CA); Benjamin Milton Shaw, Calgary (CA); Cliff Robert Baar, Calgary (CA); Alexei Kazakov, Calgary (CA); Ian Douglas McKay, Calary (CA); Dusan Jeremic, Linz (AT)

(73) Assignee: Nova Chemicals (International) S.A., Fribourg (CH)

( * ) Notice: Subject to any disclaimer, the term of this patent is extended or adjusted under 35 U.S.C. 154(b) by 153 days.

(21) Appl. No.: 13/405,487

(22) Filed: Feb. 27, 2012

(65) Prior Publication Data
US 2012/0238720 A1 Sep. 20, 2012

(30) Foreign Application Priority Data
Mar. 15, 2011 (CA) ..................................... 2734167

(51) Int. Cl.
C08F 210/16 (2006.01)
C08F 210/14 (2006.01)

(52) U.S. Cl.
USPC ..... 526/348; 526/348.5; 526/352; 526/352.2; 526/161; 526/172; 526/160; 526/170

(58) Field of Classification Search
USPC ............ 526/348, 352, 172, 161, 348.5, 352.2
See application file for complete search history.

(56) References Cited

U.S. PATENT DOCUMENTS

| | | | |
|---|---|---|---|
| 3,248,179 A | 4/1966 | Norwood | |
| 4,325,849 A | 4/1982 | Rosen et al. | |
| 4,543,399 A | 9/1985 | Jenkins, III et al. | |
| 4,588,790 A | 5/1986 | Jenkins, III et al. | |
| 4,613,484 A | 9/1986 | Ayres et al. | |
| 5,026,795 A | 6/1991 | Hogan | |
| 5,028,670 A | 7/1991 | Chinh et al. | |
| 5,206,075 A | 4/1993 | Hodgson, Jr. | |
| 5,283,278 A | 2/1994 | Daire et al. | |
| 5,317,036 A | 5/1994 | Brady, III et al. | |
| 5,352,749 A | 10/1994 | DeChellis et al. | |
| 5,382,630 A | 1/1995 | Stehling et al. | |
| 5,382,631 A | 1/1995 | Stehling et al. | |
| 5,405,922 A | 4/1995 | DeChellis et al. | |
| 5,420,220 A * | 5/1995 | Cheruvu et al. | 526/348.1 |
| 5,436,304 A | 7/1995 | Griffin et al. | |
| 5,453,471 A | 9/1995 | Bernier et al. | |
| 5,462,999 A | 10/1995 | Griffin et al. | |
| 5,487,938 A | 1/1996 | Spencer et al. | |
| 5,616,661 A | 4/1997 | Eisinger et al. | |
| 5,668,228 A | 9/1997 | Chinh et al. | |
| 5,684,097 A | 11/1997 | Palmroos et al. | |
| 5,874,513 A | 2/1999 | Watanabe et al. | |
| 5,965,677 A | 10/1999 | Stephan et al. | |
| 6,022,935 A | 2/2000 | Fischer et al. | |
| 6,114,479 A | 9/2000 | Speca et al. | |
| 6,124,230 A | 9/2000 | Speca et al. | |
| 6,140,432 A | 10/2000 | Agapiou et al. | |
| 6,248,845 B1 | 6/2001 | Loveday et al. | |
| 6,300,436 B1 | 10/2001 | Agapiou et al. | |
| 6,306,984 B1 | 10/2001 | Agapiou et al. | |
| 6,372,864 B1 * | 4/2002 | Brown | 526/65 |
| 6,391,819 B1 | 5/2002 | Agapiou et al. | |
| 6,399,535 B1 | 6/2002 | Shih et al. | |
| 6,469,103 B1 | 10/2002 | Jain et al. | |
| 6,472,342 B2 | 10/2002 | Agapiou et al. | |
| 6,528,597 B2 | 3/2003 | Loveday et al. | |
| 6,559,090 B1 | 5/2003 | Shih et al. | |
| 6,562,924 B2 | 5/2003 | Benazouzz et al. | |
| 6,608,153 B2 | 8/2003 | Agapiou et al. | |
| 6,686,306 B2 | 2/2004 | Shih | |
| 6,734,131 B2 | 5/2004 | Shih et al. | |
| 6,828,394 B2 | 12/2004 | Vaughan et al. | |
| 6,897,273 B2 * | 5/2005 | Szul et al. | 526/114 |
| 6,932,592 B2 * | 8/2005 | Farley et al. | 425/523 |
| 6,936,675 B2 * | 8/2005 | Szul et al. | 526/348.2 |
| 6,956,088 B2 | 10/2005 | Farley et al. | |
| 6,958,375 B2 | 10/2005 | Shih et al. | |
| 6,998,440 B2 * | 2/2006 | Alarcon et al. | 525/191 |
| 7,064,096 B1 | 6/2006 | Hoang et al. | |
| 7,119,153 B2 * | 10/2006 | Jensen et al. | 526/113 |
| 7,141,632 B2 | 11/2006 | Vaughan et al. | |
| 7,179,876 B2 | 2/2007 | Szul et al. | |
| 7,201,864 B2 * | 4/2007 | Weber et al. | 264/310 |
| 7,321,015 B2 | 1/2008 | Hoang et al. | |
| 7,323,523 B2 | 1/2008 | Hoang et al. | |

(Continued)

FOREIGN PATENT DOCUMENTS

| | | | | |
|---|---|---|---|---|
| EP | 107127 A1 | 5/1984 | | |
| EP | 0811638 A2 | 12/1997 | | |
| WO | WO 93/03093 A1 | 2/1993 | | |
| WO | 9426816 | 11/1994 | | |
| WO | WO 94/26816 A1 * | 11/1994 | | C08L 23/08 |
| WO | WO 95/26372 | 10/1995 | | |

OTHER PUBLICATIONS

Wild et al., Determination of branching distributions in polyethylene and ethylene comonomers, J. Poly. Sci., Poly. Phys. Ed., 1982, p. 441-455, vol. 20.

Peri et al, The surface structure of silica gel, J. Phys. Chem., 72 (8), Aug. 1968, p. 2926-2933.

Brunauer et al, Adsorption of gases in multmolecular layers, Journal of the American Chemical Society, 1938, v 60, p. 309-319.

(Continued)

*Primary Examiner* — Rip A. Lee

(74) *Attorney, Agent, or Firm* — Kenneth H Johnson

(57) ABSTRACT

Polyethylene films having a good balance of optical and mechanical properties are disclosed. The films are derived from ethylene copolymer compositions made with a suitably substituted phosphinimine catalyst. The ethylene copolymers have very narrow molecular weight distributions and broadened comonomer distributions.

47 Claims, 2 Drawing Sheets

(56) References Cited

U.S. PATENT DOCUMENTS

| | | | |
|---|---|---|---|
| 7,354,880 B2 | 4/2008 | Agapiou et al. | |
| 7,381,783 B2 | 6/2008 | Loveday et al. | |
| 7,531,602 B2 | 5/2009 | Hoang et al. | |
| 7,572,875 B2 | 8/2009 | Jensen et al. | |
| 8,431,657 B2* | 4/2013 | Wang et al. | 526/65 |
| 8,455,601 B2* | 6/2013 | Kolb et al. | 526/348 |
| 2002/0103310 A1* | 8/2002 | Szul et al. | 526/114 |
| 2005/0154167 A1* | 7/2005 | Szul et al. | 526/348.1 |
| 2008/0045406 A1 | 2/2008 | McKay et al. | |
| 2008/0108763 A1 | 5/2008 | Hoang et al. | |
| 2011/0212315 A1 | 9/2011 | Fantinel et al. | |

OTHER PUBLICATIONS

Clark et al, Kirk-Othmer Encyclopedia of Chemical Technology, Supported Catalyst, published online Nov. 2002, p. 1-37, John Wiley &Sons, Inc.

Hieber et al, Some correlations involving the shear viscosiy of polystyrene melts, Rheol. Acta, 1989, vol. 28, p. 321-332.

Hieber et al, Shear-rate-dependence modeling of polymer melt viscosity, Polym. Eng. Sci., 1992, vol. 32, p. 931-938.

Bird et al, Dynamics of Polymeric Liquids, vol. 1, Fluid Mechanics, 2nd Edition, John Wiley & Sons ,1987, p. 169-175.

ASTM D6474-99 (Reapproved 2066), STM for Determ. Mole. Wt. Distribution and Mole. Wt. Averages of Polyolefins by High Temperature Gel Permeation Chromatography, Apr. 2006.

ASTM D1238-10, STM for Melt Flow Rates of Thermoplastics by Extrusion Plastometer, Mar. 2010.

ASTM D6645-01, STM for Methyl(Comonomer) Content in Polyethylene by Infrared Spectrophotomery, Jun. 2001.

ASTM D 1003-07, STM for Haze and Luminous Transmittance of Transparent Plastic, Nov. 2007.

ASTM D-1709-04, STM for Impact Resistance of Plastic by the Free-Falling Dart Method, Oct. 2004.

\* cited by examiner

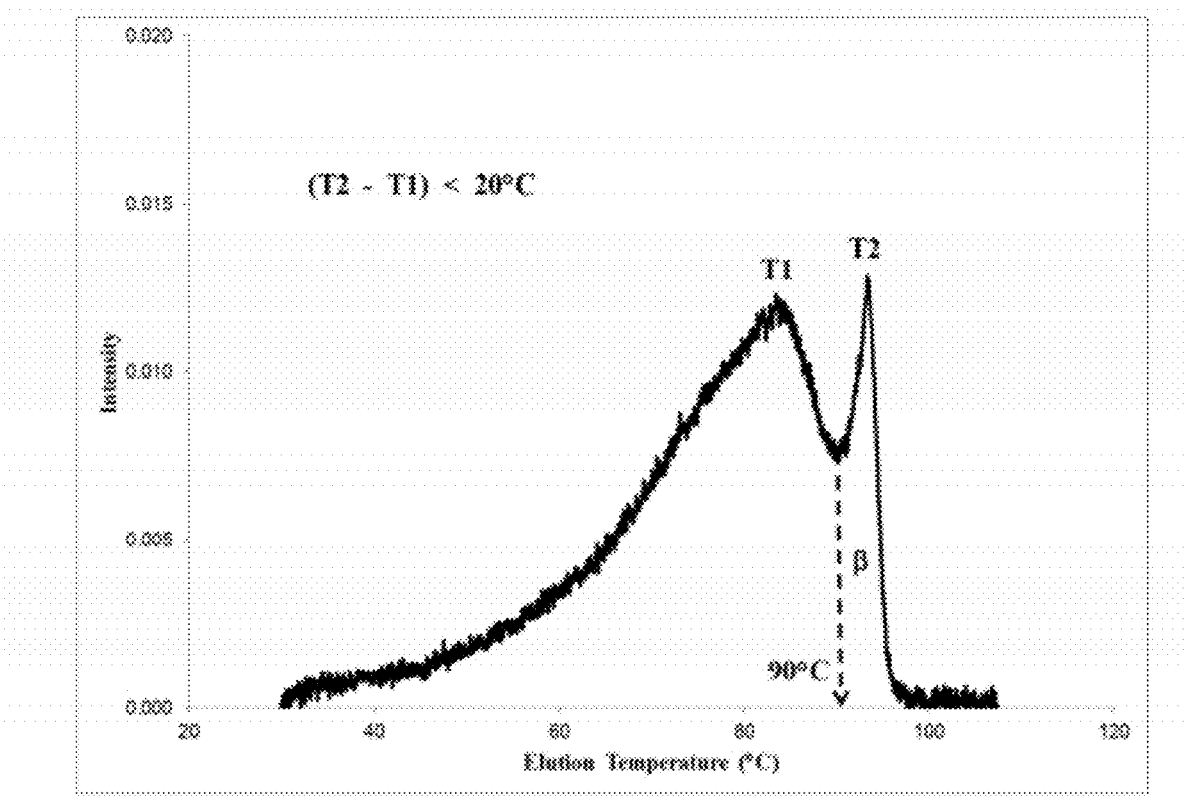

POLYETHYLENE FILM

FIELD OF THE INVENTION

The present invention is directed to the preparation of polyethylene films. Phosphinimine type catalysts having a specific ligand substitution pattern are employed to make ethylene copolymers having a narrow molecular weight and a bimodal TREF profile. The polymers have a comonomer distribution breadth index (CDBI) of between 50% and 66% and can be made into film having balanced optical and mechanical properties.

BACKGROUND OF THE INVENTION

It is well known that metallocene catalysts and other so called "single site catalysts" incorporate comonomer more evenly than traditional Ziegler-Natta catalysts when used for catalytic ethylene copolymerization with alpha olefins. This fact is often demonstrated by measuring the composition distribution breadth index (CDBI) for corresponding ethylene copolymers. The definition of composition distribution breadth index (CDBI) can be found in U.S. Pat. No. 5,206,075 and PCT publication WO 93/03093. The CDBI is conveniently determined using techniques which isolate polymer fractions based on their solubility (and hence their comonomer content). For example, temperature rising elution fractionation (TREF) as described by Wild et al. J. Poly. Sci., Poly. Phys. Ed. Vol. 20, p 441, 1982 can be employed. From the weight fraction versus composition distribution curve, the CDBI is determined by establishing the weight percentage of a copolymer sample that has a comonomer content within 50% of the median comonomer content on each side of the median.

Generally, Ziegler-Natta catalysts produce ethylene copolymers with a CDBI of less than about 50%, consistent with a heterogeneously branched copolymer. Typically, a plurality of prominent peaks is observed for such polymers in a TREF (temperature raising elution fractionation) analysis. Such peaks are consistent with the presence of heterogeneously branched material which generally includes a highly branched fraction, a medium branched fraction and a higher density fraction having little or no short chain branching. In contrast, metallocenes and other single site catalysts will most often produce ethylene copolymers having a CDBI of greater than about 65% and which usually contain a single prominent peak in a TREF analysis, consistent with a homogeneously branched copolymer.

Despite the forgoing, methods have been developed to access polyethylene copolymer compositions having a broadened comonomer distribution (i.e. more Ziegler-Natta like) while otherwise maintaining product characteristics typical of metallocene and single site catalyst resin, such as high dart impact strength for blown film. Such resins can be made, for example, by using a mixture of metallocene catalysts in a single reactor or by blending metallocene produced ethylene copolymers.

U.S. Pat. Nos. 5,382,630 and 5,382,631 describe blend compositions having a narrow molecular weight distribution, but a bimodal comonomer distribution. The blends are made using two metallocene produced resins of approximately the same molecular weight, but having different comonomer contents.

A mixed catalyst system containing a "poor comonomer incorporator" and a "good comonomer incorporator" is disclosed in U.S. Pat. Nos. 6,828,394 and 7,141,632. The poor comonomer incorporating catalyst may be a metallocene having at least one fused ring cyclopentadienyl ligand, such as an indenyl ligand, with appropriate substitution (e.g. alkyl substitution at the 1-position). The good comonomer incorporating catalyst was selected from an array of well known metallocenes and which were generally less sterically encumbered toward the front end of the molecule than the poor comonomer incorporator. These mixed catalyst systems produced polyethylene copolymers having a bimodal TREF distribution in which two elution peaks are well separated from one another, consistent with the presence of higher and lower density components. The mixed catalysts also produced ethylene copolymer having a broadened molecular weight distribution relative to ethylene copolymer made with either one of the single metallocene component catalysts.

U.S. Pat. No. 7,572,875 also describes the use of a mixed catalyst system comprising two metallocene catalysts. Each catalyst component is supported on a chemically modified support to produce ethylene copolymers, which when made into film, have high dart impact values. Polymerization takes place in a continuous slurry phase polymerization process using a loop reactor. In an embodiment of the invention, a hafnocene catalyst is combined with a zirconocene catalyst. The polymers made are further characterized as having a so called rheology "breadth parameter a" (i.e. a Carreau-Yasuda, CY parameter) of from 0.45 to 0.7.

U.S. Pat. Nos. 6,248,845; 6,528,597 and 7,381,783 disclose that a bulky ligand metallocene based on hafnium and a small amount of zirconium can be used to provide an ethylene/1-hexene copolymer which has a bimodal TREF profile. It is taught that the hafnium chloride precursor compounds used to synthesize the bulky metallocene catalysts are either contaminated with small amount of zirconium chloride or that zirconium chloride may be deliberately added. The amounts of zirconium chloride present range from 0.1 mol % to 5 mol %. Hence, the final hafnocene catalysts contain small amounts (i.e. 0.1 to 5 mol %) of their zirconocene analogues. Since zirconium based catalysts are well known to have superior activity relative to their hafnium analogs it is reasonable to expect that the products made have a significant contribution from the zirconocene species. If this is the case, then it is perhaps not surprising that a bimodal TREF profile results.

U.S. Pat. Nos. 6,956,088; 6,936,675 and 7,179,876 disclose that use of a "substantially single" bulky ligand hafnium catalyst provides an ethylene copolymer composition having a CDBI of below 55%, especially below 45% as determined by CRYSTAF. Recall, that hafnocene catalysts derived from hafnium chloride are expected to have zirconocene contaminants present in low amounts. U.S. Pat. Nos. 6,936,675 and 7,179,876 further teach that the CDBI could be changed under different temperature conditions when using hafnocene catalysts. Polymerization at lower temperatures gave ethylene copolymer having a broader composition distribution breadth index relative to polymers obtained at higher temperatures. For example, use of the catalysts bis(n-propylcyclopentadienyl)hafnium dichloride or bis(n-propylcyclopentadienyl)hafnium difluoride in a gas phase reactor for the copolymerization of ethylene and 1-hexene at ≤80° C., gave copolymers having a CDBI of between 20 and 35%, compared to CDBI values of between 40 and 50% for copolymers obtained at 85° C.

Examples where a single metallocene catalyst in a single gas phase reactor produces ethylene copolymers having very narrow molecular weight but a broadened composition distribution and multimodal TREF profile are rare.

U.S. Pat. No. 6,932,592 describes very low density (i.e. <0.916 g/cc) ethylene copolymers produced with a bulky non-bridged bis-Cp metallocene catalyst. A preferred metallocene is bis(1-methyl-3-n-butylcyclopentadienyl)zirconium dichloride. The examples show that in the gas phase, supported versions of this catalyst produce copolymer from ethylene and 1-hexene which has a CDBI of between 60 and 70% and a bimodal comonomer distribution as measured by temperature raising elution fractionation (TREF). A bimodal TREF profile is more likely to be observed for lower density copolymeric materials than for materials having a density above 0.916 g/cc due to the fact that any "higher density" fraction which may be present would be further separated from a polymer fraction having a relatively high amount of comonomer.

Use of phosphinimine catalysts for gas phase olefin polymerization is the subject matter of U.S. Pat. No. 5,965,677. The phosphinimine catalyst is an organometallic compound having a phosphinimine ligand, a cyclopentadienyl type ligand and two activatable ligands, and which is supported on a suitable particulate support such as silica. The exemplified catalysts had the formula CpTi(N=P(tBu)$_3$)X$_2$ where X was Cl, Me or Cl and —O-(2,6-iPr-C$_6$H$_3$).

We now disclose that a single phosphinimine catalyst having appropriate substitution on a cyclopentadienyl ligand can, under appropriate conditions in a single gas phase reactor, provide a linear low density polyethylene material having i) a very narrow molecular weight distribution ii) a CDBI of between 50 and 66 wt %, iii) a bimodal TREF profile, and iv) a density of from 0.916 g/cc to 0.920 g/cc. Such materials are difficult to access without use of a mixed metallocene catalyst system, use of multiple reactors systems, or use of post reactor blending methods. Although, the phosphinimine catalyst structures employed herein have been previously disclosed in the patent literature, their use in making the novel film compositions of the present invention has not. For reference see:

i) U.S. Patent Application No. 2008/0045406 expressly illustrates the use of supported (1,2-(n-butyl)(C$_6$F$_5$)Cp)Ti(N=P(t-Bu)$_3$)Cl$_2$ to copolymerize ethylene and 1-hexene in the gas phase in a bench scale reactor. The catalyst was activated with an ionic activator having an active proton. The polymer composition details provided for each run included information on branch content, molecular weight and molecular weight distribution. There is no discussion of film preparation or film properties.

ii) U.S. Pat. No. 7,531,602 expressly illustrates the use of (1,2-(n-propyl)(C$_6$F$_5$)Cp)Ti(N=P(t-Bu)$_3$)Cl$_2$ in a gas phase polymerization of ethylene at the bench scale. The phosphinimine catalyst is activated with methylaluminoxane and is supported on silica. There is no discussion of films derived from the polymer obtained using this particular phosphinimine catalyst. Instead, the patent is directed to blends in which the instant polymer is used as the higher molecular weight component in a bimodal composition.

iii) U.S. Pat. No. 7,064,096 discloses the use of (1,2-(n-butyl)(C$_6$F$_5$)Cp)Ti(N=P(t-Bu)$_3$)Cl$_2$, but only in the context of a dual catalyst formulation in which the phosphinimine catalyst is co-supported with a phenoxyimine catalyst on a silica support. The patent is directed to the formation of bimodal resins suitable for application in pipe.

iv) U.S. Pat. Nos. 7,323,523; 7,321,015 and U.S. Patent Application No. 2008/0108763 each disclose the use of (1,2-(n-butyl)(C$_6$F$_5$)Cp)Ti(N=P(t-Bu)$_3$)Cl$_2$ and (1,2-(n-hexyl)(C$_6$F$_5$)Cp)Ti(N=P(t-Bu)$_3$)Cl$_2$ but only in the context of a dual catalyst formulation in which the phosphinimine catalyst is co-supported with a phenoxyimine catalyst on a silica support. These disclosures are directed to the formation of bimodal resins suitable for application in pipe.

SUMMARY OF THE INVENTION

The present invention provides novel films compositions based on ethylene copolymers produced with specifically substituted phosphinimine catalysts. The films which may contain various additives have a good balance of optical and mechanical properties.

Provided is a film exhibiting a haze of ≤12%, a dart impact of ≥500 g/mil, an MD tear of ≥200 g/mil wherein said film comprises a copolymer of ethylene and an alpha-olefin having from 3-10 carbon atoms and which has a density of from 0.916 g/cc to 0.930 g/cc, an $I_2$ of from 0.3 to 3, an $I_{21}/I_2$<20, an a $M_w/M_n$ of less than 2.6, and satisfies the condition CDBI≤(β+25)/a-parameter, where β is the amount in wt % of the copolymer that elutes at 90° C. and above as determined by TREF and the a-parameter is the Carreau-Yasuda shear exponent as determined by DMA at 190° C.

Provided is a film comprising a copolymer of ethylene and an alpha-olefin having from 3-10 carbon atoms wherein the film has a haze of ≤12%, a dart impact of ≥500 g/mil, an MD tear of ≤200 g/mil and wherein the copolymer has a density of from 0.916 g/cc to 0.920 g/cc, a melt index ($I_2$) of from 0.3 to 3, a melt flow ratio ($I_{21}/I_2$)<20, a molecular weight distribution ($M_w/M_n$)≤2.5, and satisfies the condition: CDBI≤(β+25)/a-parameter; where β is the amount in weight % of the copolymer that elutes at 90° C. and above as determined by TREF, CDBI is the comonomer distribution breadth index determined by TREF, and the a-parameter is the Carreau-Yasuda shear exponent as determined by DMA at 190° C.

Provided is a film exhibiting a haze of ≤12%, a dart impact of ≥500 g/mil, an MD tear of ≥200 g/mil wherein said film comprises a copolymer of ethylene and an alpha-olefin having from 3-10 carbon atoms and which has a density of from 0.916 g/cc to 0.930 g/cc, an $I_{21}/I_2$<20, an a Mw/Mn of ≤2.6 and which has a TREF profile comprising i) less than 5 wt % of the copolymer represented at a temperature at or below 40° C., ii) a primary peak at a temperature T1, iii) a secondary peak at a temp T2, and iv) from 10 to 30 wt % of the copolymer is represented at a temperature of from 90° C. to 105 C.°; wherein T2>T1 and the temperature difference between T1 and T2 is less than 20° C.

Provided is a film exhibiting a haze of ≤12%, a dart impact of ≥500 g/mil, an MD tear of ≥200 g/mil wherein said film comprises a copolymer of ethylene and an alpha-olefin having from 3-10 carbon atoms and which has a density of from 0.916 g/cc to 0.920 g/cc, an $I_{21}/I_2$<20, an a Mw/Mn of ≤2.6 and which has a TREF profile comprising i) less than 5 wt % of the copolymer represented at a temperature at or below 40° C., ii) a primary peak at a temperature T1, iii) a secondary peak at a temp T2, and iv) from 10 to 30 wt % of the copolymer is represented at a temperature of from 90° C. to 105 C.°; wherein T2>T1 and the temperature difference between T1 and T2 is less than 20° C.

In an embodiment of the invention, the film comprises a copolymer which satisfies the condition Tm≤(112.7+0.4×β) where Tm is the peak melting temperature in ° C. as determined by DSC, and β is the amount in wt % of the copolymer that elutes at 90° C. and above as determined by TREF.

Provided is a film exhibiting a haze of ≤12%, a dart impact of ≥500 g/mil, an MD tear of ≥200 g/mil wherein said film comprises a copolymer of ethylene and an alpha-olefin having from 3-10 carbon atoms and which has a density of from 0.916 g/cc to 0.930 g/cc, a melt index ($I_2$) of from 0.3 to 3, a melt flow ratio $(I_{21}/I_2)<20$, a molecular weight distribution $(M_w/M_n)\leq 2.5$, and satisfies the condition: $Tm\leq(112.7+0.4\times\beta)$ where Tm is the peak melting temperature in °C. as determined by DSC, and P is the amount in wt % of the copolymer that elutes at 90°C. and above as determined by TREF.

In an embodiment of the invention, the film comprises a copolymer of ethylene and an alpha-olefin which is made in a single gas phase reactor with a single polymerization catalyst comprising an organometallic compound having a phosphinimine ligand, an alkylaluminoxane, and an inert support.

In an embodiment of the invention, the organometallic compound has the formula: $(1,2\text{-}(n\text{-}R^2)(Ar\text{—}F)Cp)M(N=P(t\text{-}Bu)_3)X_2$ where $R^2$ is an alkyl group; Ar—F is a perfluorinated aryl group, a 2,6 (i.e. ortho) fluoro substituted phenyl group, a 2,4,6 (i.e. ortho/para) fluoro substituted phenyl group or a 2,3,5,6 (i.e. ortho/meta) fluoro substituted phenyl group; M is Ti, Zr or Hf; and X is an activatable ligand.

In an embodiment of the invention, the film comprises a copolymer of ethylene and an alpha-olefin which is made in a single gas phase reactor with a single polymerization catalyst comprising an organometallic compound with the formula: $(1,2\text{-}(R^2)(C_6F_5)Cp)Ti(N=P(t\text{-}Bu)_3)X_2$, where $R^2$ is n-propyl, n-butyl or n-hexyl and where X is an activatable ligand; an alkylaluminoxane; and an inert support.

BRIEF DESCRIPTION OF THE DRAWINGS

FIG. 3 shows a TREF profile for a polymer composition having a density of 0.917 g/cc and which is made in the presence of Catalyst A.

DETAILED DESCRIPTION OF PREFERRED EMBODIMENTS

Figure 1:
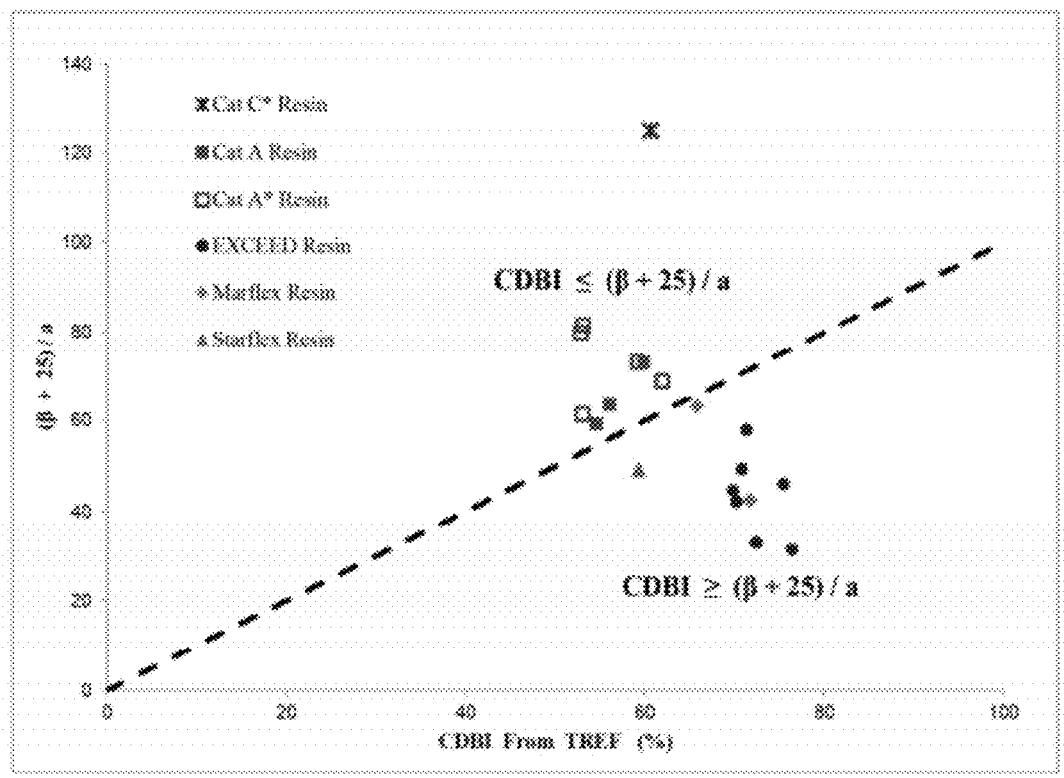
FIG. 1 is a plot of $(\beta+25)/a$-parameter vs the comonomer distribution breadth index (CDBI) for polymer compositions used in the current invention and for comparative polymer compositions; $\beta$ is the amount in wt % of the copolymer that elutes at 90°C. and above as determined by TREF and the a-parameter is the Carreau-Yasuda shear exponent as determined by DMA at 190°C.

Polymer films having a balance of mechanical properties and optical properties are made using the present invention.
Polymerization Catalyst The polymerization catalyst used in the present invention will comprise an organometallic compound based on a group 4 transition metal and having a phosphinimine ligand. Although we demonstrate herein that specific phosphinimine catalysts (having particular ligand substitution) give copolymer compositions that are useful for producing the films of the present invention, any organometallic compounds/complexes having a phosphinimine ligand and which can be used to make the copolymer compositions further defined and described below (in the section titled "The Copolymer Composition") are contemplated for use in the current invention. Collectively, organometallic compounds/complexes having at least one phosphinimine ligand and which are active in the polymerization of olefins to polymers may be termed "phosphinimine" catalysts.

In an embodiment of the invention, the phosphinimine catalyst is a group 4 organometallic complex which contains one phosphinimine ligand and one cyclopentadienyl ligand.

Polymerization catalysts usually require activation by one or more cocatalytic or activator species in order to provide polymer. Hence, polymerization catalysts are sometimes called "pre-catalysts".

In an embodiment of the invention, the organometallic compound is defined by the formula: $Cp_n(PI)_mMX_p$ where M is a group 4 transition metal selected from Ti, Hf, Zr; PI is a phosphinimine ligand; Cp is a cyclopentadienyl ligand; X is an activatable ligand; m is 1 or 2; n is 0 or 1; and p is determined by the valency of the metal M.

The phosphinimine ligand is defined by the formula: $R^1_3P=N-$ wherein each $R^1$ is independently selected from the group consisting of a hydrogen atom; a halogen atom; $C_{1\text{-}20}$ hydrocarbyl radicals which are unsubstituted by or further substituted by one or more halogen atom; $C_{1\text{-}20}$ alkyl radical; $C_{1\text{-}8}$ alkoxy radical; $C_{6\text{-}10}$ aryl or aryloxy radical; amido radical; silyl radical; and germanyl radical.

In an embodiment of the invention, the phosphinimine ligand is chosen so that each $R^1$ is a hydrocarbyl radical. In a particular embodiment of the invention, the phosphinimine ligand is tri-(tertiarybutyl)phosphinimine (i.e. where each $R^1$ is a tertiary butyl group).

As used herein, the term cyclopentadienyl ligand is meant to convey its conventional meaning, namely a ligand having a five carbon ring which is bonded to the metal via eta-5 bonding. The term "cyclopentadienyl" includes unsubstituted cyclopentadienyl and substituted cyclopentadienyl. An exemplary list of substituents for a cyclopentadienyl ligand includes the group consisting of $C_{1\text{-}10}$ hydrocarbyl radical (which hydrocarbyl substituents are unsubstituted or further substituted by for example one or more halogens or one or more alkyl or aryl groups); a halogen atom; a $C_{1\text{-}8}$ alkoxy radical; a $C_{6\text{-}10}$ aryl or aryloxy radical; an amido radical; a phosphido radical; a silyl radical; and a germanyl radical.

In an embodiment of the invention, the organometallic compound will have a 1,2-substituted cyclopentadienyl ligand and a phosphinimine ligand which is substituted by three tertiary butyl substituents.

In an embodiment of the invention, the organometallic compound will have a 1,2 substituted cyclopentadienyl ligand (i.e. a 1,2-(R)(Ar—F)Cp) where the substituents are selected from R an alkyl group, and Ar—F a perfluorinated aryl group, a 2,6 (i.e. ortho) fluoro substituted phenyl group, a 2,4,6 (i.e. ortho/para) fluoro substituted phenyl group, or a 2,3,5,6 (i.e. ortho/meta) fluoro substituted phenyl group respectively.

In an embodiment of the invention, the organometallic compound has the formula: $(1,2\text{-}(n\text{-}R^2)(Ar\text{—}F)Cp)M(N=P(t\text{-}Bu)_3)X_2$ where $R^2$ is an alkyl group; Ar—F is a perfluorinated aryl group, a 2,6 (i.e. ortho) fluoro substituted phenyl group, a 2,4,6 (i.e. ortho/para) fluoro substituted phenyl group, or a 2,3,5,6 (i.e. ortho/meta) fluoro substituted phenyl group; M is Ti, Zr or Hf; and X is an activatable ligand. In an embodiment of the invention, the organometallic compound has the formula: $(1,2\text{-}(n\text{-}R^2)(Ar\text{—}F)Cp)M(N=P(t\text{-}Bu)_3)X_2$ where $R^2$ is an alkyl group having from 1 to 20 carbons; Ar—F is a perfluorinated aryl group; M is Ti, Zr or Hf; and X is an activatable ligand. In an embodiment of the invention, the organometallic compound has the formula: $(1,2\text{-}(n\text{-}R^2)(Ar\text{—}F)Cp)M(N=P(t\text{-}Bu)_3)X_2$ where $R^2$ is a straight chain alkyl group; Ar—F is a perfluorinated aryl group; M is Ti, Zr or Hf; and X is an activatable ligand. In an embodiment of the invention, M is Ti and $R^2$ is selected from the group consisting of n-propyl, n-butyl and n-hexyl.

The term "perfluorinated aryl group" means that each hydrogen atom attached to a carbon atom in an aryl group has been replaced with a fluorine atom as is well understood in the art (e.g. a perfluorinated phenyl group or substituent has the formula —$C_6F_5$). In an embodiment of the invention, Ar—F is selected from the group comprising perfluorinated phenyl and perfluorinated naphthyl groups.

In the current invention, the term "activatable", means that the ligand X may be cleaved from the metal center M via a protonolysis reaction or abstracted from the metal center M by suitable acidic or electrophilic activator compounds respectively, examples of which are described below. The activatable ligand X may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins.

In embodiments of the present invention, the activatable ligand, X is independently selected from the group consisting of a hydrogen atom; a halogen atom, a $C_{1-10}$ hydrocarbyl radical; a $C_{1-10}$ alkoxy radical; and a $C_{6-10}$ aryl or aryloxy radical, where each of the hydrocarbyl, alkoxy, aryl, or aryl oxide radicals may be un-substituted or further substituted by one or more halogen or other group; a $C_{1-8}$ alkyl; a $C_{1-8}$ alkoxy, a $C_{6-10}$ aryl or aryloxy; an amido or a phosphido radical, but where X is not a cyclopentadienyl. Two X ligands may also be joined to one another and form for example, a substituted or unsubstituted diene ligand (i.e. 1,3-diene); or a delocalized heteroatom containing group such as an acetate or acetamidinate group. In a convenient embodiment of the invention, each X is independently selected from the group consisting of a halide atom, a $C_{1-4}$ alkyl radical and a benzyl radical.

Some organometallic compounds useful in the present invention include: (1,2-(n-propyl)($C_6F_5$)Cp)Ti(N=P(t-Bu)$_3$)Cl$_2$, (1,2-(n-butyl)($C_6F_5$)Cp)Ti(N=P(t-Bu)$_3$)Cl$_2$ and (1,2-(n-hexyl)($C_6F_5$)Cp)Ti(N=P(t-Bu)$_3$)Cl$_2$.

The activator used to activate the phosphinimine catalyst can be any suitable activator including one or more activators selected from the group consisting of alkylaluminoxanes and ionic activators, optionally together with an alkylating agent.

The alkylaluminoxanes are complex aluminum compounds of the formula: $R^3{}_2Al^1O(R^3Al^1O)_mAl^1R^3{}_2$, wherein each $R^3$ is independently selected from the group consisting of $C_{1-20}$ hydrocarbyl radicals and m is from 3 to 50. Optionally a hindered phenol can be added to the alkylaluminoxane to provide a molar ratio of $Al^1$:hindered phenol of from 2:1 to 5:1 when the hindered phenol is present.

In an embodiment of the invention, $R^3$ of the alkylaluminoxane, is a methyl radical and m is from 10 to 40.

The alkylaluminoxanes are typically used in substantial molar excess compared to the amount of group 4 transition metal in the organometallic compound/complex. The $Al^1$: group 4 transition metal molar ratios are from 10:1 to 10,000:1, preferably about 30:1 to 500:1.

It is well known in the art, that the alkylaluminoxane can serve dual roles as both an alkylator and an activator. Hence, an alkylaluminoxane activator is often used in combination with activatable ligands such as halogens.

Alternatively, the activator of the present invention may be a combination of an alkylating agent (which may also serve as a scavenger) with an activator capable of ionizing the group 4 of the organometallic compound/complex (i.e. an ionic activator). In this context, the activator can be chosen from one or more alkylaluminoxane and/or an ionic activator.

When present, the alkylating agent may be selected from the group consisting of $(R^4)_pMgX^2{}_{2-p}$ wherein $X^2$ is a halide and each $R^4$ is independently selected from the group consisting of $C_{1-10}$ alkyl radicals and p is 1 or 2; $R^4Li$ wherein in $R^4$ is as defined above, $(R^4)_qZnX^2{}_{2-q}$ wherein $R^4$ is as defined above, $X^2$ is halogen and q is 1 or 2; $(R^4)_sAl^2X^2{}_{3-s}$ wherein $R^4$ is as defined above, $X^2$ is halogen and s is an integer from 1 to 3. Preferably in the above compounds $R^4$ is a $C_{1-4}$ alkyl radical, and $X^2$ is chlorine. Commercially available compounds include triethyl aluminum (TEAL), diethyl aluminum chloride (DEAC), dibutyl magnesium (($Bu)_2Mg$), and butyl ethyl magnesium (BuEtMg or BuMgEt).

The ionic activator may be selected from the group consisting of: (i) compounds of the formula $[R^5]^+[B(R^6)_4]^-$ wherein B is a boron atom, $R^5$ is a cyclic $C_{5-7}$ aromatic cation or a triphenyl methyl cation and each $R^6$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^7)_3$; wherein each $R^7$ is independently selected from the group consisting of a hydrogen atom and a $C_{1-4}$alkyl radical; and (ii) compounds of the formula $[(R^8)_tZH]^+[B(R^6)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^6$ is as defined above; and (iii) compounds of the formula $B(R^6)_3$ wherein $R^6$ is as defined above.

In the above compounds preferably $R^6$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

Examples of compounds capable of ionizing the group 4 metal complex include the following compounds: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra (o,p-dimethylphenyl) boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra (o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra (phenyl)boron, triphenylphosphonium tetra)phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyltrispentafluorophenyl borate, triphenylmethylium phenyl-trispentafluorophenyl borate, benzene (diazonium) phenyltrispentafluorophenyl borate, tropillium tetrakis (2,3,5,6-tetrafluorophenyl) borate, triphenylmethylium tetrakis (2,3,5,6-tetrafluorophenyl) borate, benzene (diazonium) tetrakis (3,4,5-trifluorophenyl) borate, tropillium tetrakis (3,4,5-trifluorophenyl) borate, benzene (diazonium) tetrakis (3,4,5-trifluorophenyl) borate, tropillium tetrakis (1,2,2-trifluoroethenyl) borate, trophenylmethylium tetrakis (1,2,2-trifluoroethenyl) borate, benzene (diazonium) tetrakis (1,2,2-trifluoroethenyl) borate, tropillium tetrakis (2,3,4,5-tetrafluorophenyl) borate, triphenylmethylium tetrakis (2,3,4,5-tetrafluorophenyl) borate, and benzene (diazonium) tetrakis (2,3,4,5-tetrafluorophenyl) borate.

Commercially available activators which are capable of ionizing the group 4 metal of the organometallic compound/complex include: N,N-dimethylaniliniumtetrakispentafluorophenyl borate ("[Me$_2$NHPh][B(C$_6$F$_5$)$_4$]"); triphenylmethylium tetrakispentafluorophenyl borate ("[Ph$_3$C][B(C$_6$F$_5$)$_4$]"); and trispentafluorophenyl boron.

The ionic activators compounds may be used in amounts which provide a molar ratio of group 4 transition metal to boron that will be from 1:1 to 1:6.

Optionally, mixtures of alkylaluminoxanes and ionic activators can be used as activators for the organometallic complex.

In an embodiment of the present invention, the polymerization catalyst will comprise an inert support. Preferably, the organometallic compound having a phosphinimine ligand (i.e. the "phosphinimine catalyst") is supported.

The inert support used in the present invention can be any support known in the art to be suitable for use with polymerization catalysts. For example the support can be any porous or non porous support material, such as talc, inorganic oxides, inorganic chlorides, aluminophosphates (i.e. AlPO$_4$) and polymer supports (e.g. polystyrene, etc). Hence, supports include Group 2, 3, 4, 5, 13 and 14 metal oxides generally, such as silica, alumina, silica-alumina, magnesium oxide, magnesium chloride, zirconia, titania, clay (e.g. montmorillonite) and mixtures thereof.

Agglomerate supports such as agglomerates of silica and clay may also be used as a support in the current invention.

Supports are generally used in calcined form. An inorganic oxide support, for example, will contain acidic surface hydroxyl groups which will react with a polymerization catalyst. Prior to use, the inorganic oxide may be dehydrated to remove water and to reduce the concentration of surface hydroxyl groups. Calcination or dehydration of a support is well known in the art. In an embodiments of the invention, the support is calcined at temperatures above 200° C., or above 300° C., or above 400° C., or above 500° C. In other embodiments, the support is calcined at from about 500° C. to about 1000° C., or from about 600° C. to about 900° C. The resulting support may be free of adsorbed water and may have a surface hydroxyl content from about 0.1 to 5 mmol/g of support, or from 0.5 to 3 mmol/g. The amount of hydroxyl groups in a silica support may be determined according to the method disclosed by J. B. Peri and A. L. Hensley Jr., in *J. Phys. Chem.*, 72 (8), 1968, pg 2926.

The support material, especially an inorganic oxide, typically has a surface area of from about 10 to about 700 m$^2$/g, a pore volume in the range from about 0.1 to about 4.0 cc/g and an average particle size of from about 5 to about 500 μm. In a more specific embodiment, the support material has a surface area of from about 50 to about 500 m$^2$/g, a pore volume in the range from about 0.5 to about 3.5 cc/g and an average particle size of from about 10 to about 200 μm. In another more specific embodiment the support material has a surface area of from about 100 to about 400 m$^2$/g, a pore volume in the range from about 0.8 to about 3.0 cc/g and an average particle size of from about 5 to about 100 μm.

The support material, especially an inorganic oxide, typically has an average pore size (i.e. pore diameter) of from about 10 to about 1000 Angstroms (Å). In a more specific embodiment, the support material has an average pore size of from about 50 to about 500 Å. In another more specific embodiment, the support material has an average pore size of from about 75 to about 350 Å.

The surface area and pore volume of a support may be determined by nitrogen adsorption according to B.E.T. techniques, which are well known in the art and are described in the *Journal of the American Chemical Society*, 1939, v 60, pg 209-319.

A silica support which is suitable for use in the present invention has a high surface area and is amorphous. By way of example only, useful silicas are commercially available under the trademark of Sylopol® 958, 955 and 2408 by the Davison Catalysts, a Division of W. R. Grace and Company and ES-70W by Ineos Silica.

Agglomerate supports comprising a clay mineral and an inorganic oxide, may be prepared using a number techniques well known in the art including pelletizing, extrusion, drying or precipitation, spray-drying, shaping into beads in a rotating coating drum, and the like. A nodulization technique may also be used. Methods to make agglomerate supports comprising a clay mineral and an inorganic oxide include spray-drying a slurry of a clay mineral and an inorganic oxide. Methods to make agglomerate supports comprising a clay mineral and an inorganic oxide are disclosed in U.S. Pat. Nos. 6,686,306; 6,399,535; 6,734,131; 6,559,090 and 6,968,375.

An agglomerate of clay and inorganic oxide which is useful in the current invention may have the following properties: a surface area of from about 20 to about 800 m$^2$/g, preferably from 50 to about 600 m$^2$/g; particles with a bulk density of from about 0.15 to about 1 g/ml, preferably from about 0.20 to about 0.75 g/ml; an average pore diameter of from about 30 to about 300 Angstroms (Å), preferably from about 60 to about 150 Å; a total pore volume of from about 0.10 to about 2.0 cc/g, preferably from about 0.5 to about 1.8 cc/g; and an average particle size of from about 4 to 250 microns (μm), preferably from about 8 to 100 microns.

Alternatively, a support, for example a silica support, may be treated with one or more salts of the type: Zr(SO$_4$)$_2$.4H$_2$O, ZrO(NO$_3$)$_2$, and Fe(NO$_3$)$_3$ as taught in co-pending Canadian Patent Application No. 2,716,772. Supports that have been otherwise chemically treated are also contemplated for use with the catalysts and processes of the present invention.

The present invention is not limited to any particular procedure for supporting the catalyst components. Processes for depositing a single site catalyst complex (i.e. the organometallic compound) as well as an activator on a support are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright ©2001 by John Wiley & Sons, Inc.; for some non-limiting methods to support a single site catalyst see U.S. Pat. No. 5,965,677). For example, the organometallic compound may be added by co-precipitation with the support material. The activator can be added to the support before and/or after the organometallic compound or together with the organometallic compound. Optionally, the activator can be added to a supported organometallic compound in situ or the organometallic compound may be added to the support in situ or the organometallic compound can be added to a supported activator in situ. The organometallic compound may be slurried or dissolved in a suitable diluent or solvent and then added to the support. Suitable solvents or diluents include but are not limited to hydrocarbons and mineral oil. The organometallic compound (i.e. the single site catalyst component) may be added to the solid support, in the form or a solid, solution or slurry, followed by the addition of the activator in solid form or as a solution or slurry. Organometallic compound, activator, and support can be mixed together in the presence or absence of a solvent.

Polymerization Process

The copolymer compositions used to prepare the films of the present invention are preferably made using a single polymerization catalyst in a gas phase or slurry phase reactor. Use of a single polymerization catalyst in a single gas phase reactor is especially preferred.

Detailed descriptions of slurry polymerization processes are widely reported in the patent literature. For example, particle form polymerization, or a slurry process where the temperature is kept below the temperature at which the polymer goes into solution is described in U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Further examples of slurry processes are described in U.S. Pat. No. 4,613,484.

Slurry processes are conducted in the presence of a hydrocarbon diluent such as an alkane (including isoalkanes), an aromatic or a cycloalkane. The diluent may also be the alpha olefin comonomer used in copolymerizations. Alkane diluents include propane, butanes, (i.e. normal butane and/or isobutane), pentanes, hexanes, heptanes and octanes. The monomers may be soluble in (or miscible with) the diluent, but the polymer is not (under polymerization conditions). The polymerization temperature is preferably from about 5° C. to about 200° C., most preferably less than about 120° C. typically from about 10° C. to 100° C. The reaction temperature is selected so that the ethylene copolymer is produced in the form of solid particles. The reaction pressure is influenced by the choice of diluent and reaction temperature. For example, pressures may range from 15 to 45 atmospheres (about 220 to 660 psi or about 1500 to about 4600 kPa) when isobutane is used as diluent (see, for example, U.S. Pat. No. 4,325,849) to approximately twice that (i.e. from 30 to 90 atmospheres—about 440 to 1300 psi or about 3000–9100 kPa) when propane is used (see U.S. Pat. No. 5,684,097). The pressure in a slurry process must be kept sufficiently high to keep at least part of the ethylene monomer in the liquid phase. The reaction typically takes place in a jacketed closed loop reactor having an internal stirrer (e.g. an impeller) and at least one settling leg. Catalyst, monomers and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and recover the polymer generally in a cyclone. The diluent and unreacted monomers are recovered and recycled back to the reactor.

A gas phase process is commonly carried out in a fluidized bed reactor. Such gas phase processes are widely described in the literature (see for example U.S. Pat. Nos. 4,543,399, 4,588,790, 5,028,670, 5,317,036, 5,352,749, 5,405,922, 5,436,304, 5,433,471, 5,462,999, 5,616,661 and 5,668,228). In general, a fluidized bed gas phase polymerization reactor employs a "bed" of polymer and catalyst which is fluidized by a flow of monomer, comonomer and other optional components which are at least partially gaseous. Heat is generated by the enthalpy of polymerization of the monomer (and comonomers) flowing through the bed. Un-reacted monomer, comonomer and other optional gaseous components exit the fluidized bed and are contacted with a cooling system to remove this heat. The cooled gas stream, including monomer, comonomer and optional other components (such as condensable liquids), is then re-circulated through the polymerization zone, together with "make-up" monomer (and comonomer) to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients.

The reactor pressure in a gas phase process may vary from about atmospheric to about 600 Psig. In a more specific embodiment, the pressure can range from about 100 psig (690 kPa) to about 500 psig (3448 kPa). In another more specific embodiment, the pressure can range from about 200 psig (1379 kPa) to about 400 psig (2759 kPa). In yet another more specific embodiment, the pressure can range from about 250 psig (1724 kPa) to about 350 psig (2414 kPa).

The reactor temperature in a gas phase process may vary according to the heat of polymerization as described above. In a specific embodiment, the reactor temperature can be from about 30° C. to about 130° C. In another specific embodiment, the reactor temperature can be from about 60° C. to about 120° C. In yet another specific embodiment, the reactor temperature can be from about 70° C. to about 110° C. In still yet another specific embodiment, the temperature of a gas phase process can be from about 70° C. to about 100° C.

The fluidized bed process described above is well adapted for the preparation of polyethylene but other monomers (i.e. comonomers) may also be employed. Monomers include ethylene and $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene, and 1-decene, styrene, alpha methyl styrene, p-t-butyl styrene, and the constrained-ring cyclic olefins such as cyclobutene, cyclopentene, dicyclopentadiene norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In one embodiment, the invention is directed toward a polymerization process involving the polymerization of one or more of the monomer(s) including ethylene alone or in combination with one or more linear or branched comonomer(s) having from 3 to 30 carbon atoms, preferably 3-12 carbon atoms, more preferably 4 to 8 carbon atoms. The process is particularly well suited to the copolymerization reactions involving the polymerization of ethylene in combination with one or more of the comonomers, for example alpha-olefin monomers of propylene, butene-1, pentene-1,4-methylpentene-1, hexene-1, octene-1, decene-1, styrene and cyclic and polycyclic olefins such as cyclopentene, norbornene and cyclohexene or a combination thereof. Other comonomers for use with ethylene can include polar vinyl monomers, diolefins such as 1,3-butadiene, 1,4-pentadiene, 1,4-hexadiene, 1,5-hexadiene, norbornadiene, and other unsaturated monomers including acetylene and aldehyde monomers. Higher alpha-olefins and polyenes or macromers can be used also. Preferably the comonomer is an alpha-olefin having from 3 to 15 carbon atoms, preferably 4 to 12 carbon atoms and most preferably 4 to 10 carbon atoms.

In an embodiment of the invention, ethylene comprises at least 75 wt % of the total weight of monomer (i.e. ethylene) and comonomer (i.e. alpha olefin) that is fed to a polymerization reactor.

In an embodiment of the invention, ethylene comprises at least 85 wt % of the total weight of monomer (i.e. ethylene) and comonomer (i.e. alpha olefin) that is fed to a polymerization reactor.

In another embodiment ethylene is polymerized with at least two different comonomers to form a terpolymer and the like, the preferred comonomers are a combination of monomers, alpha-olefin monomers having 3 to 10 carbon atoms, more preferably 3 to 8 carbon atoms, optionally with at least one diene monomer. The preferred terpolymers include the combinations such as ethylene/butene-1/hexene-1, ethylene/propylene/butene-1, ethylene/propylene/hexene-1, ethylene/propylene/norbornadiene, ethylene/propylene/1,4-hexadiene and the like.

In an embodiment of the invention, the copolymer is a copolymer of ethylene and an alpha-olefin having from 3-10 carbon atoms, and is made in a single gas phase reactor with a single polymerization catalyst comprising: an organometallic compound having a phosphinimine ligand; an alkylaluminoxane cocatalyst; and an inert support.

In an embodiment of the invention, the copolymer is a copolymer of ethylene and an alpha-olefin having from 3-10 carbon atoms and is made in a single gas phase reactor with a single polymerization catalyst comprising: an organometallic compound having the formula $(1,2\text{-}(R^2)(Ar\text{---}F)Cp)Ti(N\text{=}P(t\text{-}Bu)_3)X_2$, where $R^2$ is an alkyl group, Ar—F is a perfluorinated aryl group, a 2,6 (i.e. ortho) fluoro substituted phenyl group, a 2,4,6 (i.e. ortho/para) fluoro substituted phenyl group, or a 2,3,5,6 (i.e. ortho/meta) fluoro substituted phenyl group aryl group, and X is an activatable ligand; and an activator.

In an embodiment of the invention, the copolymer is a copolymer of ethylene and an alpha-olefin having from 3-10 carbon atoms and is made in a single gas phase reactor with a single polymerization catalyst comprising: an organometallic compound having the formula $(1,2\text{-}(R^2)(C_6F_5)Cp)Ti(N\text{=}P(t\text{-}Bu)_3)X_2$, where $R^2$ is n-propyl, n-butyl or n-hexyl and where X is an activatable ligand; and an activator.

In an embodiment of the invention, the copolymer is a copolymer of ethylene and an alpha-olefin having from 3-10 carbon atoms and is made in a single gas phase reactor with a single polymerization catalyst comprising: an organometallic compound having the formula $(1,2\text{-}(R^2)(Ar\text{---}F)Cp)Ti(N\text{=}P(t\text{-}Bu)_3)X_2$, where $R^2$ is an alkyl group, Ar—F is a perfluorinated aryl group, a 2,6 (i.e. ortho) fluoro substituted phenyl group, a 2,4,6 (i.e. ortho/para) fluoro substituted phenyl group or a 2,3,5,6 fluoro substituted phenyl group and where X is an activatable ligand; an activator; and an inert support.

In an embodiment of the invention, the copolymer is a copolymer of ethylene and an alpha-olefin having from 3-10 carbon atoms and is made in a single gas phase reactor with a single polymerization catalyst comprising: an organometallic compound having the formula $(1,2\text{-}(R^2)(C_6F_5)Cp)Ti(N\text{=}P(t\text{-}Bu)_3)X_2$, where $R^2$ is n-propyl, n-butyl or n-hexyl and where X is an activatable ligand; an activator; and an inert support.

In an embodiment of the invention, the copolymer is a copolymer of ethylene and an alpha-olefin having from 3-10 carbon atoms and is made in a single gas phase reactor with a single polymerization catalyst comprising: an organometallic compound having the formula $(1,2\text{-}(R^2)(Ar\text{---}F)Cp)Ti(N\text{=}P(t\text{-}Bu)_3)X_2$, where $R^2$ is an alkyl group, Ar—F is a perfluorinated aryl group, a 2,6 (i.e. ortho) fluoro substituted phenyl group, a 2,4,6 (i.e. ortho/para) fluoro substituted phenyl group, or a 2,3,5,6 (i.e. ortho/meta) fluoro substituted phenyl group, and X is an activatable ligand; an alkylaluminoxane; and an inert support.

In an embodiment of the invention, the copolymer is a copolymer of ethylene and an alpha-olefin having from 3-10 carbon atoms and is made in a single gas phase reactor with a single polymerization catalyst comprising: an organometallic compound having the formula $(1,2\text{-}(R^2)(C_6F_5)Cp)Ti(N\text{=}P(t\text{-}Bu)_3)X_2$, where $R^2$ is n-propyl, n-butyl or n-hexyl and where X is an activatable ligand; an alkylaluminoxane; and an inert support.

The polymerization catalyst may be fed to a reactor system in a number of ways. If the catalyst is supported on a suitable support, the catalyst may be fed to a reactor in dry mode using a dry catalyst feeder, examples of which are well known in the art. Alternatively, a supported catalyst may be fed to a reactor as a slurry in a suitable diluent. If the catalyst is unsupported, the catalyst can be fed to a reactor as a solution or as a slurry in a suitable solvent or diluents. Polymerization catalyst components, which may include a single site catalyst complex, a cocatalyst, a scavenger and an inert support, may be combined prior to their addition to a polymerization zone, or they may be combined on route to a polymerization zone. To combine catalyst components on route to a polymerization zone they can be fed as solutions or slurries (in suitable solvents or diluents) using various feed line configurations which may become coterminous before reaching the reactor. Such configurations can be designed to provide areas in which catalyst components flowing to a reactor can mix and react with one another over various "hold up" times which can be moderated by changing catalyst component solution or slurry flow rates.

The polymerization process may be carried out in the presence of any suitable anti-static agent or agents. The use of anti-static agents in a gas-phase or a slurry phase polymerization processes is well known in the art. Antistatic agents are also recognized in the art by the term "continuity additive". Generally speaking a "continuity additive" is a substance or a mixture of substances which, when present in appropriate amounts, can reduce, prevent or mitigate at least one of fouling, sheeting and static level of a material in polymerization reactor.

Some non-limiting examples of continuity additives are alkoxylated amines (also known as alkanolamines, see European Patent No. 811,638 and U.S. Pat. Nos. 6,140,432; 6,124,230; 6,114,479 for examples), carboxylate metal salts (see U.S. Pat. Nos. 7,354,880; 6,300,436; 6,306,984; 6,391,819; 6,472,342 and 6,608,153 for examples), polysulfones, polymeric polyamines and sulfonic acids (see U.S. Pat. Nos. 6,562,924; 6,022,935 and 5,283,278 for examples). Other possible continuity additives are described in European Pat. Appl. No. 107,127, including polyoxyethylenealkylamines.

Specific examples of alkoxylated amines which may be used in the present invention are Kemamine AS-990™, ARMOSTAT 1800™, and ATMER-163™ which are available from Ciba, Akzo-Nobel or Witco Chemical Company. Other suitable continuity additives include aluminum stearate and aluminum oleate. Still other specific continuity additives are supplied commercially under the trademarks OCTASTAT™ and STADIS™. The continuity additive STADIS is described in U.S. Pat. Nos. 7,476,715; 6,562,924 and 5,026,795 and is available form Octel Starreon. STADIS generally comprises a polysulfone copolymer, a polymeric amine and an oil soluble sulfonic acid.

In an embodiment of the invention, a continuity additive is added directly to the supported catalyst. The amount of continuity additive added to a catalyst will depend on a number of factors such as but not limited to the type of continuity additive and the type of polymerization catalyst (and the type of support). Accordingly the amount of continuity additive used is not specifically defined, but can be from 0 (e.g. optionally) up to 150,000 parts per million (ppm) based on the weight of the supported catalyst. Alternatively, the amount of continuity additive added to a catalyst can be from about 0.2 to 10 weight percent based on the total weight of the catalyst system. By way of non-limiting example only, from 10,000 to 30,000 ppm of a STADIS continuity additive is used when it is combined with a supported polymerization catalyst.

In another embodiment, the antistatic may be added directly to the reactor and separately from the polymerization catalyst. The total amount of continuity additive or additives to be present in the reactor will generally not exceed 250 or 200, or 150, or 125, or 100, or 90, or 80, or 70 or 60, or 50, or 40, or 30, or 20 or 10 ppm (parts per million by weight of polymer being produced) and/or the amount of continuity additive will be zero, or greater than 1, or 3, or 5, or 7, or 10, or 12, or 14, or 15, or 17, or 20 ppm based on the weight of polymer being produced (usually expressed as pounds or kilograms per unit of time). Any of these lower limits are combinable with any upper limit. These amounts of continuity additive contemplate one, two, three, four or more continuity additives. The total amount of one or two or more continuity additives in the reactor will be understood to be additive and where the total amount can be described as disclosed immediately above. The continuity additive can be added directly to the reactor through a dedicated feed line and/or added to any convenient feed stream, including the ethylene feed stream, the comonomer feed stream, the catalyst feed line, or the recycle line. If more than one continuity additive is used, each one may be added to the reactor as separate feed streams, or as any combination of separate feed streams or mixtures. The manner in which the continuity additives are added to the reactor is not important, so long as the additive(s) are well dispersed within the fluidized bed and that their feed rates (or concentrations) are regulated in a manner to provide minimum levels of fouling and/or static. From the productivity of the catalyst it is fairly routine to determine the feed rate of the antistatic to the reactor based on the catalyst feed rate.

In another embodiment of the invention, the continuity additive (e.g. antistatic agent) may be added directly to the reactor and separately from the polymerization catalyst as well as added directly to the supported catalyst.

Optionally, scavengers are added to the polymerization process. The present invention can be carried out in the presence of any suitable scavenger or scavengers. Scavengers are well known in the art.

In an embodiment of the invention, scavengers are organoaluminum compounds having the formula: $Al^3(X^3)_n(X^4)_{3-n}$, where $(X^3)$ is a hydrocarbyl having from 1 to about 20 carbon atoms; $(X^4)$ is selected from alkoxide or aryloxide, any one of which having from 1 to about 20 carbon atoms; halide; or hydride; and n is a number from 1 to 3, inclusive; or alkylaluminoxanes having the formula: $R^3{}_2Al^1O(R^3Al^1O)_mAl^1R^3{}_2$ wherein each $R^3$ is independently selected from the group consisting of $C_{1-20}$ hydrocarbyl radicals and m is from 3 to 50. Some non-limiting preferred scavengers useful in the current invention include triisobutylaluminum, triethylaluminum, trimethylaluminum or other trialkylaluminum compounds.

The scavenger may be used in any suitable amount but by way of non-limiting examples only, can be present in an amount to provide a molar ratio of Al:M (where M is the metal of the organometallic compound) of from about 20 to about 2000, or from about 50 to about 1000, or from about 100 to about 500. Generally the scavenger is added to the reactor prior to the catalyst and in the absence of additional poisons and over time declines to 0, or is added continuously.

Optionally, the scavengers may be independently supported. For example, an inorganic oxide that has been treated with an organoaluminum compound or alkylaluminoxane may be added to the polymerization reactor. The method of addition of the organoaluminum or alkylaluminoxane compounds to the support is not specifically defined and is carried out by procedures well known in the art.

The Copolymer Composition

The polymer compositions used to prepare the films of the present invention have a narrow molecular weight distribution ($M_w/M_n$), a broader than expected comonomer distribution (CDBI) and a bimodal TREF profile. Preferably the polymer compositions are copolymers of ethylene and an alpha olefin selected from 1-butene, 1-hexene and 1-octene. In the present invention, the copolymer compositions are not polymer blends (neither post, nor in-reactor blends), but optionally they may be used as a component in a polymer blend.

In embodiments of the invention, the copolymer composition will comprise at least 75 weight % of ethylene units, or at least 80 wt % of ethylene units, or at least 85 wt % of ethylene units with the balance being an alpha-olefin unit, based on the weight of the copolymer composition.

In embodiments of the invention, the copolymer will have a melt index of from 0.3 to 5 g/10 min, or from 0.3 to 3 g/10 min, or from 0.5 to 2 g/10 min.

In embodiments of the invention, the copolymer will have a density of from 0.915 g/cc to 0.930 g/cc, or from 0.916 g/cc to 0.930 g/cc, or from 0.916 g/cc to 0.925 g/cc, or from 0.916 g/cc to 0.920 g/cc or from, or from 0.917 g/cc to 0.920 g/cc, or from 0.917 g/cc to 0.919 g/cc.

In an embodiment of the invention, the polymer composition will have a density of greater than 0.916 g/cc and lower than 0.920 g/cc.

In the present invention, the copolymers will have a unimodal profile in a gel permeation chromatography (GPC) curve generated according to the method of ASTM D6474-99. The term "unimodal" is herein defined to mean there will be only one significant peak or maximum evident in the GPC-curve. In contrast, by the term "bimodal" it is meant that there will be a secondary peak or shoulder which represents a higher or lower molecular weight component (i.e. the molecular weight distribution, can be said to have two maxima in a molecular weight distribution curve). Alternatively, the term "multimodal" denotes the presence of more than two maxima in a molecular weight distribution curve generated according to the method of ASTM D6474-99.

In embodiments of the invention, the copolymer will have a molecular weight distribution ($M_w/M_n$) as determined by gel permeation chromatography (GPC) of from 1.6 to 2.6, or from 1.7 to 2.5, or from 1.7 to 2.4, or from 1.7 to 2.3, or from 1.7 to 2.2, or from 1.8 to 2.4, or from 1.8 to 2.3, or from 1.8 to 2.2.

In another embodiment of the invention, the copolymer will have a molecular weight distribution ($M_w/M_n$) of less than 2.6. In yet another embodiment of the invention, the copolymer will have a molecular weight distribution ($M_w/M_n$) of ≤2.5. In still another embodiment of the invention, the copolymer will have a molecular weight distribution ($M_w/M_n$) of ≤2.4. In yet another embodiment of the invention, the copolymer will have a molecular weight distribution ($M_w/$ $M_n$) of ≤2.3. In yet further embodiments of the invention, the copolymer will have a molecular weight distribution ($M_w/M_n$) of ≤2.2, or ≤2.1, or ≤2.0.

In embodiments of the invention, the copolymers of the invention will exhibit a weight average molecular weight (Mw) as determined by gel permeation chromatography (GPC) of from 30,000 to 250,000, or from 50,000 to 200,000, or from 50,000 to 175,000, or from 75,000 to 150,000, or from 80,000 to 125,000.

In an embodiment of the invention, the copolymer will have a flat comonomer incorporation profile as measured using Gel-Permeation Chromatography with Fourier Transform Infra-Red detection (GPC-FTIR). In an embodiment of the invention, the copolymer will have a negative (i.e. "normal") comonomer incorporation profile as measured using GPC-FTIR. In an embodiment of the invention, the copolymer will have an inverse (i.e. "reversed") or partially inverse comonomer incorporation profile as measured using GPC-FTIR. If the comonomer incorporation decreases with molecular weight, as measured using GPC-FTIR, the distribution is described as "normal" or "negative". If the comonomer incorporation is approximately constant with molecular weight, as measured using GPC-FTIR, the comonomer distribution is described as "flat". The terms "reversed comonomer distribution" and "partially reversed comonomer distribution" mean that in the GPC-FTIR data obtained for the copolymer, there is one or more higher molecular weight components having a higher comonomer incorporation than in one or more lower molecular weight segments. If the comonomer incorporation rises with molecular weight, the distribution is described as "reversed". Where the comonomer incorporation rises with increasing molecular weight and then declines, the comonomer distribution is described as "partially reversed".

In the present invention, the copolymers will have a melt flow ratio (the MFR=$I_{21}/I_2$) of less than 20, or less than 17, or less than 16.5. In a specific embodiment of the invention, the copolymer will have an $I_{21}/I_2$ of from 10 to 19.5. In another specific embodiment of the invention, the copolymer will have an $I_{21}/I_2$ or from 11 to 19. In yet another specific embodiment of the invention, the copolymer will have an $I_{21}/I_2$ or from 14 to 19. In still another specific embodiment of the invention, the copolymer will have an $I_{21}/I_2$ or from 13 to 17. In still yet another specific embodiment of the invention, copolymer will have an $I_{21}/I_2$ or from 14 to 16.5.

In the present invention, the copolymers will have a comonomer distribution breadth index (CDBI), as determined by temperature elution fractionation (TREF), of from 40% to 70%. In embodiments of the invention, the copolymers will have a CDBI of from 45% to 70%, or from 45% to 65%, or from 45 to 60%, or from 50% to 66% or from 50% to 65%, or from 50% to 60%.

In an embodiment of the present invention, the copolymer will satisfy the following condition: CDBI≤(β+25)/a-parameter, where β is the amount in weight % of the copolymer that elutes at 90° C. and above (≥90° C.) as determined by TREF and the a-parameter is the Carreau-Yasuda shear exponent as determined by dynamic mechanical analysis (DMA) at 190° C.

In an embodiment of the present invention, the copolymer will satisfy the following condition: CDBI≤(β+30)/a-parameter, where β is the amount in weight % of the copolymer that elutes at 90° C. and above (≥90° C.) as determined by TREF and the a-parameter is the Carreau-Yasuda shear exponent as determined by dynamic mechanical analysis (DMA) at 190° C.

In embodiments of the invention, the copolymer will have a CY a-parameter (also called the Carreau-Yasuda shear exponent) of from 0.4 to 0.7, or from 0.5 to 0.7, or from 0.5 to 0.6.

In an embodiment of the invention, the copolymer will satisfy the condition Tm≤(112.7+0.4×β) where Tm is the peak melting temperature in ° C. as determined by differential scanning calorimetry (DSC), and β is the amount in wt % of the copolymer that elutes at 90° C. and above (≥90° C.) as determined by TREF.

In embodiments of the invention, the copolymer has an β of from 10 to 30 wt %, or from 10 to 25 wt %, or from 10 to 20 wt %, or from 10 to 15 wt %, or from 12 to 30 wt %, or from 12 to 25 wt %, or from 12 to 20 wt %, or from 14 to 30 wt %, or from 14 to 25 wt %, or from 14 to 20 wt %.

In an embodiment of the invention, the copolymers will have a TREF profile, as measured by temperature rising elution fractionation, comprising: i) less than 5 wt % of the copolymer represented at a temperature at or below 40° C.; ii) a primary peak at a temperature T1; iii) a secondary peak at a temp T2; and iv) from 10 to 30 wt % of the copolymer is represented at a temperature of from 90° C. to 105 C.°; wherein T2>T1 and the difference in temperature between T1 and T2 is less than 20° C. By the term "primary" peak, it is meant that the peak corresponds to an elution intensity maximum in a TREF profile which corresponds to a majority fraction of the copolymer. By the term "secondary" peak, it is meant that the peak corresponds to an elution intensity maximum in a TREF profile which corresponds to a minority fraction of the copolymer. Hence, for clarity, the primary and secondary peaks have a maximum which occurs at temperatures T1 and T2 respectively.

In embodiments of the invention, the difference in temperature between T1 and T2 will be <20° C., or the difference in temperature between T1 and T2 will be ≤15° C., or the difference in temperature between T1 and T2 will be ≤13° C., or the difference in temperature between T1 and T2 will be ≤10° C.

In an embodiment of the invention, from 10 to 30 wt % of the copolymer will be represented within a temperature range of from 90° C. to 105° C. in a TREF profile. In another embodiment of the invention, from 10 to 25 wt % of the copolymer will be represented at a temperature range of from 90° C. to 105° C. in a TREF profile. In yet another embodiment of the invention, from 12 to 30 wt % of the copolymer will be represented at a temperature range from 90° C. to 105° C. in a TREF profile. In yet another embodiment of the invention, from 12 to 25 wt % of the copolymer will be represented at a temperature range from 90° C. to 105° C. in a TREF profile. In a further embodiment of the invention, from 12 to 20 wt % of the copolymer will be represented at a temperature range of from 90° C. to 105° C. in a TREF profile. In still another embodiment of the invention, from 14 to 25 wt % of the copolymer will be represented at a temperature from 90° C. to 105° C. in a TREF profile. In still yet another embodiment of the invention, from 14 to 20 wt % of the copolymer will be represented at a temperature of from 90° C. to 105° C. in a TREF profile.

In an embodiment of the invention, T2 is greater than 90° C.

In an embodiment of the invention, T1 is in the range of from 75 to 90° C. and T2 is in the range of 85 to 100° C., provided that T2 is greater than T1.

In an embodiment of the invention, T1 is in the range of from 80 to 90° C. and T2 is in the range of 90 to 100° C., provided that T2 is greater than T1.

In embodiments of the invention, the copolymer will have a hexane extractables level of ≤1.0 wt %, or ≤0.75 wt %, or ≤0.5 wt %, or ≤0.5 wt %, or <0.4 wt %, or ≤0.3 wt %. In an embodiment of the invention, the copolymer has a hexane extractables level of from 0.1 to 0.3 wt %.

In an embodiment of the present invention, the copolymer will have little or no long chain branching. Without wishing to be bound by any single theory, the melt index ratio, $I_{10}/I_2$ and its comparison with $M_w/M_n$ for a given copolymer may be a useful proxy for the presence of long chain branching. Ethylene copolymers which have low $I_{10}/I_2$ ratios (i.e. of below about 7.0) and which satisfy the relationship $I_{10}/I_2-4.63<M_w/M_n$ are consistent with low levels or an absence of long chain branching (see European Pat. No. 751,967).

In an embodiment of the present invention, the copolymer will have a melt index ratio, $I_{10}/I_2$ value of ≤7.0. In other embodiments of the invention, the copolymer will have an $I_{10}/I_2$ of ≤6.5, or ≤6.0 or ≤5.5.

In an embodiment of the present invention, the copolymer will satisfy the relationship $I_{10}/I_2-4.63<M_w/M_n$.

Film Production

The extrusion-blown film process is a well known process for the preparation of plastic film. The process employs an extruder which heats, melts and conveys the molten plastic and forces it through an annular die. Typical extrusion temperatures are from 330 to 500° F., especially 350 to 460° F.

The polyethylene film is drawn from the die and formed into a tube shape and eventually passed through a pair of draw or nip rollers. Internal compressed air is then introduced from a mandrel causing the tube to increase in diameter forming a "bubble" of the desired size. Thus, the blown film is stretched in two directions, namely in the axial direction (by the use of forced air which "blows out" the diameter of the bubble) and in the lengthwise direction of the bubble (by the action of a winding element which pulls the bubble through the machinery). External air is also introduced around the bubble circumference to cool the melt as it exits the die. Film width is varied by introducing more or less internal air into the bubble thus increasing or decreasing the bubble size. Film thickness is controlled primarily by increasing or decreasing the speed of the draw roll or nip roll to control the draw-down rate.

The bubble is then collapsed into two doubled layers of film immediately after passing through the draw or nip rolls. The cooled film can then be processed further by cutting or sealing to produce a variety of consumer products. While not wishing to be bound by theory, it is generally believed by those skilled in the art of manufacturing blown films that the physical properties of the finished films are influenced by both the molecular structure of the ethylene copolymer and by the processing conditions. For example, the processing conditions are thought to influence the degree of molecular orientation (in both the machine direction and the axial or cross direction).

A balance of "machine direction" ("MD") and "transverse direction" ("TD"—which is perpendicular to MD) molecular orientation is generally considered desirable for the films associated with the invention (for example, Dart Impact strength, Machine Direction and Transverse Direction tear properties).

Thus, it is recognized that these stretching forces on the "bubble" can affect the physical properties of the finished film. In particular, it is known that the "blow up ratio" (i.e. the ratio of the diameter of the blown bubble to the diameter of the annular die) can have a significant effect upon the dart impact strength and tear strength of the finished film.

The above description relates to the preparation of monolayer films. Multilayer films may be prepared by 1) a "co-extrusion" process that allows more than one stream of molten polymer to be introduced to an annular die resulting in a multi-layered film membrane or 2) a lamination process in which film layers are laminated together.

In an embodiment of the invention, the films of this invention are prepared using the above described blown film process.

An alternative process is the so-called cast film process, wherein the polyethylene is melted in an extruder, then forced through a linear slit die, thereby "casting" a thin flat film. The extrusion temperature for cast film is typically somewhat hotter than that used in the blown film process (with typically operating temperatures of from 450 to 550° F.). In general, cast film is cooled (quenched) more rapidly than blown film.

In an embodiment of the invention, the films of this invention are prepared using a cast film process.

Additives

The copolymer composition used in the current invention to make films, may also contain additives, such as for example, primary antioxidants (such as hindered phenols, including vitamin E); secondary antioxidants (especially phosphites and phosphonites); nucleating agents, plasticizers or process aids (especially fluoroelastomer and/or polyethylene glycol bound process aid), acid scavengers, stabilizers, anticorrosion agents, blowing agents, other ultraviolet light absorbers such as chain-breaking antioxidants, etc., quenchers, antistatic agents, slip agents, pigments, dyes and fillers and cure agents such as peroxide.

These and other common additives in the polyolefin industry may be present in copolymer compositions from 0.01 to 50 wt % in one embodiment, and from 0.1 to 20 wt % in another embodiment, and from 1 to 5 wt % in yet another embodiment, wherein a desirable range may comprise any combination of any upper wt % limit with any lower wt % limit.

In an embodiment of the invention, antioxidants and stabilizers such as organic phosphites and phenolic antioxidants may be present in the copolymer compositions from 0.001 to 5 wt % in one embodiment, and from 0.01 to 0.8 wt % in another embodiment, and from 0.02 to 0.5 wt % in yet another embodiment. Non-limiting examples of organic phosphites that are suitable are tris(2,4-di-tert-butylphenyl)phosphite (IRGAFOS 168) and tris (nonyl phenyl) phosphite (WESTON 399). Non-limiting examples of phenolic antioxidants include octadecyl 3,5 di-t-butyl-4-hydroxyhydrocinnamate (IRGANOX 1076) and pentaerythrityl tetrakis(3,5-di-tert-butyl-4-hydroxyphenyl) propionate (IRGANOX 1010); and 1,3,5-Tri(3,5-di-tert-butyl-4-hydroxybenzyl-isocyanurate (IRGANOX 3114).

Fillers may be present in the copolymer composition from 0.1 to 50 wt % in one embodiment, and from 0.1 to 25 wt % of the composition in another embodiment, and from 0.2 to 10 wt % in yet another embodiment. Fillers include but are not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports which are known in the art.

Fatty acid salts may also be present in the copolymer compositions. Such salts may be present from 0.001 to 2 wt % of the copolymer composition in one embodiment, and from 0.01 to 1 wt % in another embodiment. Examples of fatty acid metal salts include lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid, suitable metals including Li, Na, Mg, Ca, Sr, Ba, Zn, Cd, Al, Sn, Pb and so forth. Desirable fatty acid salts are selected from magnesium stearate, calcium stearate, sodium stearate, zinc stearate, calcium oleate, zinc oleate, and magnesium oleate.

With respect to the physical process of producing the blend of the copolymer and one or more additives, sufficient mixing should take place to assure that a uniform blend will be produced prior to conversion into a finished product. The copolymer can be in any physical form when used to blend with the one or more additives. In one embodiment, reactor granules, defined as the granules of polymer that are isolated from the polymerization reactor, are used to blend with the additives. The reactor granules have an average diameter of from 10 μm to 5 mm, and from 50 μm to 10 mm in another embodiment. Alternately, the copolymer is in the form of pellets, such as, for example, having an average diameter of from 1 mm to 6 mm that are formed from melt extrusion of the reactor granules.

One method of blending the additives with the copolymer is to contact the components in a tumbler or other physical blending means, the copolymer being in the form of reactor granules. This can then be followed, if desired, by melt blending in an extruder. Another method of blending the components is to melt blend the copolymer pellets with the additives directly in an extruder, or any other melt blending means.

Film Properties.

The films of the present invention are made from the copolymers defined as above. Generally, an additive as described above is mixed with the copolymer prior to film production. The films have a good balance of optical and mechanical properties. Accordingly, the films of the present invention will have a haze of <15%, a machine direction (MD) tear strength of ≥200 g/mil, and a dart impact strength of ≥500 g/mil.

In an embodiment of the invention, the film will have a haze of less than 15%. In another embodiment of the invention, the film will have a haze of less than 12%. In yet another embodiment of the invention, the film will have a haze ≤10%.

In embodiments of the invention, the film will have a dart impact of ≥500 g/mil, or ≥600 g/mil, or ≥700 g/mil, or ≥750 g/mil, or ≥800 g/mil. In another embodiment of the invention, the film will have a dart impact of from 600 g/mil to 900 g/mil. In yet another embodiment of the invention, the film will have dart impact of from 600 g/mil to 800 g/mil. In still yet another embodiment of the invention, the film will have dart impact of from 600 g/mil to 750 g/mil. In a further embodiment of the invention, the film will have dart impact of from 500 g/mil to 700 g/mil.

In embodiments of the invention, the film will have an (Elmendorf) machine direction (MD) tear value of ≥200 g/mil, or ≥250 g/mil, or ≥300 g/mil. In another embodiment of the invention, the film will have a MD tear value of from 200 g/mil to 350 g/mil. In yet another embodiment of the invention, the film will have a MD tear value of from 200 g/mil to 300 g/mil. In still another embodiment of the invention, the film will have a MD tear value of from 250 g/mil to 300 g/mil.

In embodiments of the invention, the film will have a (Elmendorf) transverse direction (TD) tear value of ≥300 g/mil, or ≥350 g/mil, or ≥380 g/mil, or ≥390 g/mil, or ≥400 g/mil. In another embodiment of the invention, the film will have a TD tear value of from 300 g/mil to 500 g/mil. In another embodiment of the invention, the film will have a TD tear value of from 350 g/mil to 450 g/mil.

In embodiments of the invention, the film will have a ratio of MD tear to TD tear (MD tear/TD tear) of ≥0.55, or ≥0.60, or ≥0.65, or ≥0.70. In another embodiment of the invention, the film will have a ratio MD tear to TD tear of from 0.50 to 0.85. In yet another embodiment of the invention, the film will have a ratio of MD tear to TD tear of from 0.55 to 0.80. In still another embodiment of the invention, the film will have a ratio of MD tear to TD tear of from 0.55 to 0.75. In still yet embodiment of the invention, the film will have a ratio of MD tear to TD tear of from 0.60 to 0.70.

In embodiments of the invention, the film will have a machine direction (MD) secant modulus at 1% strain of ≤110 Mpa, or ≥120 Mpa, or ≥130 Mpa, or ≥135 Mpa≥140 Mpa. In an embodiment of the invention, the film will have a machine direction (MD) secant modulus at 1% strain of between 110 Mpa and 160 Mpa. In an embodiment of the invention, the film will have a machine direction (MD) secant modulus at 1% strain of between 120 Mpa and 150 Mpa. In another embodiment of the invention, the film will have a machine direction (MD) secant modulus at 1% strain of between 130 Mpa and 170 Mpa. In yet another embodiment of the invention, the film will have a machine direction (MD) secant modulus at 1% strain of between 130 Mpa and 160 Mpa.

In an embodiment of the invention, the film will have a transverse direction (TD) secant modulus at 1% strain of ≥130 Mpa, or ≥140 Mpa, or ≥150 Mpa, or ≥160 Mpa. In an embodiment of the invention, the film will have a transverse direction (TD) secant modulus at 1% strain of between 130 Mpa and 190 Mpa. In another embodiment of the invention, the film will have a transverse direction (TD) secant modulus at 1% strain of between 140 Mpa and 180 Mpa. In yet another embodiment of the invention, the film will have a transverse direction (TD) secant modulus at 1% strain of between 130 Mpa and 170 Mpa.

The film may have a total thickness ranging from 0.5 mils to 4 mils (note: 1 mil=0.0254 mm), which will depend on for example the die gap employed during film casting or film blowing.

The above description applies to monolayer films. However, the film of the current invention may be used in a multilayer film. Multilayer films can be made using a co-extrusion process or a lamination process. In co-extrusion, a plurality of molten polymer streams are fed to an annular die (or flat cast) resulting in a multi-layered film on cooling. In lamination, a plurality of films are bonded together using, for example, adhesives, joining with heat and pressure and the like. A multilayer film structure may, for example, contain tie layers and/or sealant layers.

The film of the current invention may be a skin layer or a core layer and can be used in at least one or a plurality of layers in a multilayer film. The term "core" or the phrase "core layer", refers to any internal film layer in a multilayer film. The phrase "skin layer" refers to an outermost layer of a multilayer film in packaging produce. The phrase "sealant layer" refers to a film that is involved in the sealing of the film to itself or to another layer in a multilayer film. A "tie layer" refers to any internal layer that adheres two layers to one another.

The thickness of the multilayer films can be from about 0.5 mil to about 10 mil total thickness.

EXPERIMENTAL

Catalysts

Polymerization catalyst A, A*, B, C and C* were made using the following procedures.

Catalyst A. The organometallic compound, (1,2-(n-propyl)($C_6F_5$)Cp)Ti(N=P(t-Bu)$_3$)Cl$_2$ was made according to the procedure given in U.S. Pat. No. 7,531,602 (see Preparation of Catalyst for the Second Polymer Component in the Examples section). Sylopol 2408 silica purchased from Grace Davison was calcined by fluidizing with air at 200° C. for 2 hours and subsequently with nitrogen at 600° C. for 6 hours. 77.86 grams of the calcined silica was added to 300 mL of toluene. 215.86 g of a MAO solution containing 4.5 weight % Al purchased from Albemarle was added to the silica slurry quantitatively. The mixture was stirred for 1 hour at ambient temperature. The stirring rate should be such so as not to break-up the silica particles. 1.825 grams of (1,2-(n-propyl)($C_6F_5$)Cp)Ti(N═P(t-Bu)$_3$)Cl$_2$ was weighed into a small vessel and 10 mL of toluene added. The metal complex solution was added to the silica slurry quantitatively. The resulting slurry was stirred for 2 hours at ambient temperature. The slurry was filtered, yielding a clear filtrate. The solid component was washed twice with toluene, and once with pentane. The final product was dried in vacuo to between 300 and 400 mtorr and stored under nitrogen until used. The finished catalyst had a pale yellow to pale orange colour.

Catalyst B. The organometallic compound, (1,2-(n-butyl)($C_6F_5$)Cp)Ti(N═P(t-Bu)$_3$)Cl$_2$ was made according to the procedure give in U.S. Pat. No. 7,064,096. Sylopol 2408 silica purchased from Grace Davison was calcined by fluidizing with air at 200° C. for 2 hours and subsequently with nitrogen at 600° C. for 6 hours. 144.48 grams of the calcined silica was added to 560 mL of toluene. 509.88 g of a MAO solution containing 4.5 weight % Al purchased from Albemarle was added to the silica slurry quantitatively. The mixture was stirred for 2 hours at ambient temperature. The stirring rate should be such so as not to break-up the silica particles. 4.24 grams of (1,2-(n-butyl)($C_6F_5$)Cp)Ti(N═P(t-Bu)$_3$)Cl$_2$ was weighed into a small vessel and 10 mL of toluene added. The metal complex solution was added to the silica slurry quantitatively. The resulting slurry was stirred for 2 hours at 45° C. The slurry was filtered, yielding a clear filtrate. The solid component was washed twice with toluene and once with pentane. The final product was dried in vacuo to between 300 and 400 mtorr and stored under nitrogen until used. The finished catalyst had a pale yellow to pale orange colour.

Catalyst C. The organometallic compound, (1,2-(n-hexyl)($C_6F_5$)Cp)Ti(N═P(t-Bu)$_3$)Cl$_2$ was made according to the procedure given in U.S. Pat. Nos. 7,323,523 and 7,321,015. Sylopol 2408 silica purchased from Grace Davison was calcined by fluidizing with air at 200° C. for 2 hours and subsequently with nitrogen at 600° C. for 6 hours. 76.01 grams of the calcined silica was added to 300 mL of toluene. 86.45 g of an MAO solution containing 13.5 weight % Al purchased from Albemarle was added to the silica slurry quantitatively. The mixture was stirred for 30 minutes at ambient temperature. The stirring rate should be such so as not to break-up the silica particles. 2.36 grams of (1,2-(n-hexyl)($C_6F_5$)Cp)Ti(N═P(t-Bu)$_3$)Cl$_2$ was weighed into a small vessel and 10 mL of toluene added. The metal complex solution was added to the silica slurry quantitatively. The resulting slurry was stirred for 1 hour at ambient temperature. The slurry was filtered, yielding a clear filtrate. The solid component was washed twice with toluene and once with pentane. The final product was dried in vacuo to between 300 and 400 mtorr and stored under nitrogen until used. The finished catalyst had a pale yellow to pale orange colour.

Procedures for catalysts made with Zr(SO$_4$)$_2$ treated Support. To 176.414 grams of Sylopol 2408 silica purchased from Grace Davison was added an aqueous solution of the Zr(SO$_4$)$_2$ (17.628 grams of Zr(SO$_4$)$_2$ in 353 mL water) using incipient wetness impregnation procedure. The resulting solid support was dried in air at 135° C. to produce a free flowing powder which was subsequently calcined by fluidizing with air at 200° C. for 2 hours and subsequently with nitrogen at 600° C. for 6 hours.

Catalyst A*. The organometallic compound, (1,2-(n-propyl)($C_6F_5$)Cp)Ti(N═P(t-Bu)$_3$)Cl$_2$ was made according to the procedure given in U.S. Pat. No. 7,531,602. A Zr(SO$_4$)$_2$ treated silica support was be prepared as taught above (see also co-pending Canadian Patent Application No. 2,716,772). To 38.460 grams of the calcined Zr(SO$_4$)$_2$ treated silica was added 150 mL of toluene. Next, 107.418 g of a MAO solution containing 4.5 weight % Al purchased from Albemarle was added to the silica slurry quantitatively. The mixture was stirred for 1 hour at ambient temperature. The stirring rate should be such so as not to break-up the silica particles. 0.928 grams of (1,2-(n-propyl)($C_6F_5$)Cp)Ti(N═P(t-Bu)$_3$)Cl$_2$ was weighed into a small vessel and 10 mL of toluene added. The metal complex solution was added to the silica slurry quantitatively. The resulting slurry was stirred for 2 hours at ambient temperature. The slurry was filtered, yielding a clear filtrate. The solid component was washed twice with toluene, and once with pentane. The final product was dried in vacuo to between 300 and 400 mtorr and stored under nitrogen until used. The finished catalyst had a pale yellow to pale orange colour.

Catalyst C*. The organometallic compound, (1,2-(n-hexyl)($C_6F_5$)Cp)Ti(N═P(t-Bu)$_3$)Cl$_2$ was made according to the procedure given in U.S. Pat. Nos. 7,323,523 and 7,321,015. A Zr(SO$_4$)$_2$ treated silica support was be prepared as taught above (also see co-pending Canadian Patent Application No. 2,716,772). To 41.048 grams of the calcined Zr(SO$_4$)$_2$ treated silica was added 170 mL of toluene. Next, 79.350 g of a MAO solution containing 4.5 weight % Al purchased from Albemarle was added to the silica slurry quantitatively. The mixture was stirred for 1 hour at ambient temperature. The stirring rate should be such so as not to break-up the silica particles. 0.992 grams of (1,2-(n-hexyl)($C_6F_5$)Cp)Ti(N═P(t-Bu)$_3$)Cl$_2$ was weighed into a small vessel and 10 mL of toluene added. The metal complex solution was added to the silica slurry quantitatively. The resulting slurry was stirred for 2 hours at ambient temperature. The slurry was filtered, yielding a clear filtrate. The solid component was washed twice with toluene, and once with pentane. The final product was dried in vacuo to between 300 and 400 mtorr and stored under nitrogen until used. The finished catalyst had a pale yellow to pale orange colour.

Polymerization and Copolymer Compositions

Continuous ethylene/1-hexene gas phase copolymerization experiments were conducted in a 56.4 L Technical Scale Reactor (TSR) in continuous gas phase operation. Ethylene polymerizations were run at 80° C.-90° C. with a total operating pressure of 300 pounds per square inch gauge (psig). Gas phase compositions for ethylene and 1-hexene were controlled via closed-loop process control to values of 50.0 and 0.5-1.5 mole %, respectively. Hydrogen was metered into the reactor in a molar feed ratio of 0.0002-0.0003 relative to ethylene feed during polymerization. Nitrogen constituted the remainder of the gas phase mixture (approximately 49 mole %). Typical production rate for these conditions is 2.0 to 3.0 kg of polyethylene per hour.

The catalyst metering device used for administering catalyst to the reactor is equipped with a probe that measures electrostatic charge carried by the solid material passing through a monitored tube leading catalyst to the reactor.

TSR results and conditions are shown in Table 1.

TABLE 1

TSR Conditions

| Catalyst | A | B | C |
|---|---|---|---|
| Productivity (g PE/g Cat) | 3500 | 5780 | >10000 |
| Hydrogen (mol %) | 0.0298 | 0.0352 | 0.0240 |
| Hexene (mol %) | 1.19 | 1.25 | 0.800 |
| C6/C2 (mol/mol feed) | 0.025 | 0.0267 | 0.0245 |
| Temp (° C.) | 80 | 85 | 85 |
| Production rate (kg/hr) | 2.7 | 2.5 | 2.7 |
| Residence Time (hrs) | 1.6 | 3.3 | 2.9 |
| Bulk Density (lb per cubic foot) | 25.8-27.8 | 24.5 | 28 |

The properties of the copolymers isolated are shown in Table 2. Copolymers A (nPr), B (nBu) and C (nHex) are made using catalysts A, B, and C respectively. The comparative resin D in Table 2 is commercially available EXCEED 1018CA™ (ExxonMobil Chemical Company). The comparative resin E in Table 2 is commercially available Marflex D139™ resin (Chevron Phillips Chemical Company). The comparative resin F in Table 2 is commercially available Marflex D143™ (Chevron Phillips Chemical Company).

Melt index, $I_2$, in g/10 min was determined on a Tinius Olsen Plastomer (Model MP993) in accordance with ASTM D1238 condition F at 190° C. with a 2.16 kilogram weight. Melt index, $I_{10}$, was determined in accordance with ASTM D1238 condition F at 190° C. with a 10 kilogram weight. High load melt index, $I_{21}$, in g/10 min was determined in accordance with ASTM D1238 condition E at 190° C. with a 21.6 kilogram weight.

Polymer density was determined in grams per cubic centimeter (g/cc) according to ASTM D1928.

Molecular weight information ($M_w$, $M_n$ and $M_z$ in g/mol) and molecular weight distribution ($M_w/M_n$) were analyzed by gel permeation chromatography (GPC), using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw").

The branch frequency of copolymer samples (i.e. the short chain branching, SCB per 1000 carbons) and the $C_6$ comonomer content (in wt %) was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

The determination of branch frequency as a function of molecular weight (and hence the comonomer distribution) was carried out using high temperature Gel Permeation Chromatography (GPC) and FT-IR of the eluent. Polyethylene standards with a known branch content, polystyrene and hydrocarbons with a known molecular weight were used for calibration.

Hexane extractables on 3.5 mil blown films were determined according to ASTM D5227.

To determine CDBI, a solubility distribution curve is first generated for the copolymer. This is accomplished using data acquired from the TREF technique. This solubility distribution curve is a plot of the weight fraction of the copolymer that is solubilized as a function of temperature. This is converted to a cumulative distribution curve of weight fraction versus comonomer content, from which the CDBI is determined by establishing the weight percentage of a copolymer sample that has a comonomer content within 50% of the median comonomer content on each side of the median. The weight percentage of a higher density fraction, wt % 90-105° C., is determined by calculating the area under the TREF curve at an elution temperature of from 90 to 105° C., or β is determined by calculating the area under the TREF curve at an elution temperature ≥90° C.; see for example FIG. 3. The weight percent of copolymer eluting below 40° C. was determined similarly. For the purpose of simplifying the correlation of composition with elution temperature, all fractions are assumed to have a Mn≥15,000, where Mn is the number average molecular weight of the fraction. Any low weight fractions present generally represent a trivial portion of the polymer. The remainder of this description and the appended claims maintain this convention of assuming all fractions have Mn≥15,000 in the CDBI measurement.

Temperature Rising Elution Fractionation (TREF) Methods.

TREF method-A. A polymer sample (6 to 12 mg) was introduced into a glass vial with about 10 ml of 1,2,4-trichlorobenzene (TCB). The glass vial was then placed into a triethylene glycol bath sitting on a hot plate with stirring. The oil bath was heated to 150° C. for 5 hours to dissolve the polymer sample. After dissolution, the glass vial with the polymer solution was transferred into the crystallization triethylene glycol bath that was pre-heated to 110° C. After stabilization at 110° C., for about 0.5 hour, the temperature of the crystallization oil bath was decreased to 15° C. with a rate of 0.025° C./minute. After the crystallization, the crystallized polymer was mixed with celite and the slurry was loaded into the TREF column. Next, the TREF column was installed onto the elution device. The crystallized sample was eluted with TCB (2.0 mL/minute) with a temperature ramp from 25 to 110° C. (0.25° C./minute). The TREF column was cleaned at the end of the run for 30 minutes at 150° C. The data were processed using, Excel spreadsheet and TREF software developed in-house.

TREF method-B. Polymer samples (50 to 150 mg) were introduced into the reactor vessel of a crystallization-TREF unit (Polymer ChAR™). The reactor vessel was filled with 20 to 40 ml 1,2,4-trichlorobenzene (TCB), and heated to the desired dissolution temperature (e.g. 150° C.) for 1 to 3 hours. The solution (0.5 to 1.5 ml) was then loaded into the TREF column filled with stainless steel beads. After equilibration at a given stabilization temperature (e.g. 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer ChAR software, Excel spreadsheet and TREF software developed in-house.

Both TREF procedures described above are well known to persons skilled in the art and both TREF methods give similar results when determining a TREF profile, CDBI, copolymer wt % below 40° C., copolymer wt % from 90° C. to 105° C. or β which is equal to the copolymer wt % at ≥90° C. However to for the purposes of the present invention, and to avoid possible amibuity, a person skilled in the art is directed to use TREF method-B to assess copolymers and to establish the TREF profile, the CDBI, the copolymer wt % below 40° C., the copolymer wt % from 90° C. to 105° C. and the β which is equal to the copolymer wt % at ≥90° C.

The peak melting point ($T_m$) and percent of crystallinity of the polymers are determined by using a TA Instrument DSC Q1000 Thermal Analyser at 10° C./min. In a DSC measurement, a heating-cooling-heating cycle from room temperature to 200° C. or vice versa is applied to the polymers to minimize the thermo-mechanical history associated with them. The melting point and percent of crystallinity are determined by the primary peak temperature and the total area under the DSC curve respectively from the second heating data. The peak melting temperature $T_m$ is the higher temperature peak, when two peaks are presented in a bimodal DSC profile (typically also having the greatest peak height).

The melt strength of a polymer is measured on Rosand RH-7 capillary rheometer with a die of L/D ratio 10:1 at 190° C. A polymer melt is extruded through a capillary die under a constant rate and then the polymer strand is drawn at an increasing haul-off speed until it ruptures. The maximum steady value of the force in the plateau region of a force versus time curve is defined as the melt strength for the polymer.

Dynamic Mechanical Analysis (DMA). Small-strain (10%) oscillatory shear measurements were performed on a Rheometrics SR5 Stress rotational rheometer using parallel-plate geometry. All rheological tests were performed at 190° C. The complex viscosity $|\eta^*(\omega)|$ versus frequency ($\omega$) data were then curve fitted using the modified three parameter Carreau-Yasuda (CY) empirical model to obtain the zero shear viscosity $\eta_0$, characteristic viscous relaxation time $\tau_\eta$, and the breadth of rheology parameter-a. The simplified Carreau-Yasuda (CY) empirical model is as follows:

$$|\eta^*(\omega)|=\eta_0/[1+(\tau_\eta\omega)^a]^{(1-n)/a}$$

wherein: $|\eta^*(\omega)|$=magnitude of complex shear viscosity; $\eta_0$=zero shear viscosity; $T_\eta$=characteristic relaxation time; a="breadth" of rheology parameter (which is also called the "Carreau-Yasuda shear exponent" or the "CY a-parameter" or simply the "a-parameter" in the current invention); n=fixes the final power law slope, fixed at 2/11; and $\omega$=angular frequency of oscillatory shearing deformation. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids*, Volume 1, Fluid Mechanics, 2nd Edition, John Wiley & Sons (1987), especially pages 169-175; each of which is incorporated herein by reference in its entirety.

TABLE 2

| Copolymer Properties | | | |
|---|---|---|---|
| Copolymer | A (nPr) | B (nBu) | C (nHex) |
| bulk density (lb-cu ft) | 26.0 | 24.5 | 28 |
| density (g/cc) | 0.9172 | 0.9178 | 0.9173 |
| MI, $I_2$ (g/10 min) | 1.09 | 1.32 | 1.20 |
| MFR, $I_{21}/I_2$ | 16.2 | 15.0 | 14.7 |
| $I_{10}/I_2$ | 5.80 | — | — |
| TREF profile[NOTE 1] | a significant peak is present at 83.7° C. and at 93.3° C. | a significant peak is present at 78.4° C. and at 91.3° C. | a significant peak is present at 82.0° C. and at 92.8° C. |
| Wt % 90-105° C., β (≥90° C.) | 14.9, 14.9 | 11.6, 11.6 | 14.3, 14.3 |
| Wt % < 40 ° C. | <5 | <5 | <5 |
| CDBI-50 (%) | 53.0 | 66.4 | 60.3 |
| comonomer profile | Negative | negative | — |
| DSC melt temp (° C.) | 107 and 117.5 | 106.6 and 117.3 | 107.5 and 118.2 |
| % crystallinity | 45.8 | 46.2 | 44.8 |
| CY a-parameter | 0.6497 | — | — |
| Mw (×$10^{-3}$) | 104.2 | 90.8 | 93.4 |
| Mn (×$10^{-3}$) | 51.1 | 47.1 | 47.7 |
| Mz (×$10^{-3}$) | 191.2 | 146.9 | 154.3 |
| $M_w/M_n$ | 2.04 | 1.93 | 1.96 |
| $C_6$ content (wt %) | 6.5 | 7.0 | 6.8 |
| SCB/1000 C | 11.3 | 12.2 | 11.9 |
| hexane extractables (%) | 0.32 | — | 0.22 |
| melt strength (cN) | 2.7 | 2.01 | 2.02 |
| Comparative Resin | D | E | F |
| bulk density (lb-cu ft) | — | — | — |
| density (g/cc) | 0.9189 | 0.918 | 0.9155 |
| MI, $I_2$ (g/10 min) | 1 | 0.88 | 1.39 |
| MFR, $I_{21}/I_2$ | 16.2 | 17.2 | 15.1 |
| $I_{10}/I_2$ | 5.76 | 6.03 | — |
| TREF profile[NOTE 1] | a significant peak is present at 81.4° C. and at 92.9° C. | a significant peak is present at 76.7° C. and at 89.9° C. | a significant peak is present at 73.6 ° C. and at 88.8° C. |
| Wt % 90-105° C., β (≥90° C.) | 10.9, 10.9 | 6.7, 6.7 | 2.8, 2.8 |
| Wt % < 40 ° C. | — | — | — |
| CDBI-50 (%) | 70.8 | 65.8 | 71.7 |
| comonomer profile | Reverse | reverse | reverse |
| DCS melt temp | 107.9 and 118.8 | 105.5 and 116.3 | 103.4 and 114.4 |
| % crystallinity | 45.1 | 44.8 | 43.3 |
| CY a-parameter | 0.7266 | 0.5032 | 0.6534 |
| Mw (×$10^{-3}$) | 103.8 | 103.4 | 88.5 |
| Mn (×$10^{-3}$) | 53.1 | 48.0 | 41.2 |
| Mz (×$10^{-3}$) | 167.4 | 192.8 | 153.2 |
| $M_w/M_n$ | 1.96 | 2.15 | 2.14 |
| $C_6$ content (wt %) | 6.3 | 6.3 | 6.7 |
| SCB/1000 C | 10.9 | 11.0 | 11.6 |
| hexane extractables (%) | 0.32 | 0.32 | 0.39 |
| melt strength (cN) | 2.56 | 4.16 | 2.54 |

[NOTE 1] The TREF analysis used for copolymer B and C in Table 2 was TREF method-A. All other copolymers analyzed herein, were analyzed using TREF method-B.

The copolymer compositions used in the present invention are distinct from commercially available EXCEED 1018CA™ (comparative resin D), Marflex D139™ (comparative resin E) and Marflex D143™ (comparative resin F) resins of similar density. In some embodiments, the copolymers used in the present invention satisfy the condition CDBI≤(β+25)/a-parameter, where β is the amount in wt % of the copolymer that elutes at 90° C. and above as determined by TREF (method-B) and the a-parameter is the Carreau-Yasuda shear exponent as determined by DMA at 190° C. FIG. 1 shows plots of (β+25)/a-parameter vs CDBI for copolymers used in the present invention and spanning a density range of between 0.9162 g/cc and 0.919 g/cc and a melt index $I_2$ range of between 0.85 and 2.2. The copolymers (which are made using either Catalyst A, Catalyst A* or Catalyst C*) are all above the line in FIG. 1 and satisfy the condition CDBI≤(β+25)/a-parameter. In contrast, none of the EXCEED 1018 comparative resins (the density ranged from 0.912 g/cc to 0.923 g/cc and the melt index, $I_2$ ranged from 1.0 to 4.5 g/10 min), or the Marflex D139 (d=0.918 g/cc, $I_2$=0.88 g/10 min), Marflex D143 (d=0.916 g/cc, $I_2$=1.39 g/10 min) and STARFLEX™ (STARFLEX is commercially available from LyondellBasell; d=0.917 g/cc, $I_2$=0.90 g/10 min) comparative resins satisfy the condition: CDBI≤(β+25)/a-parameter (see FIG. 1).

Figure 2:
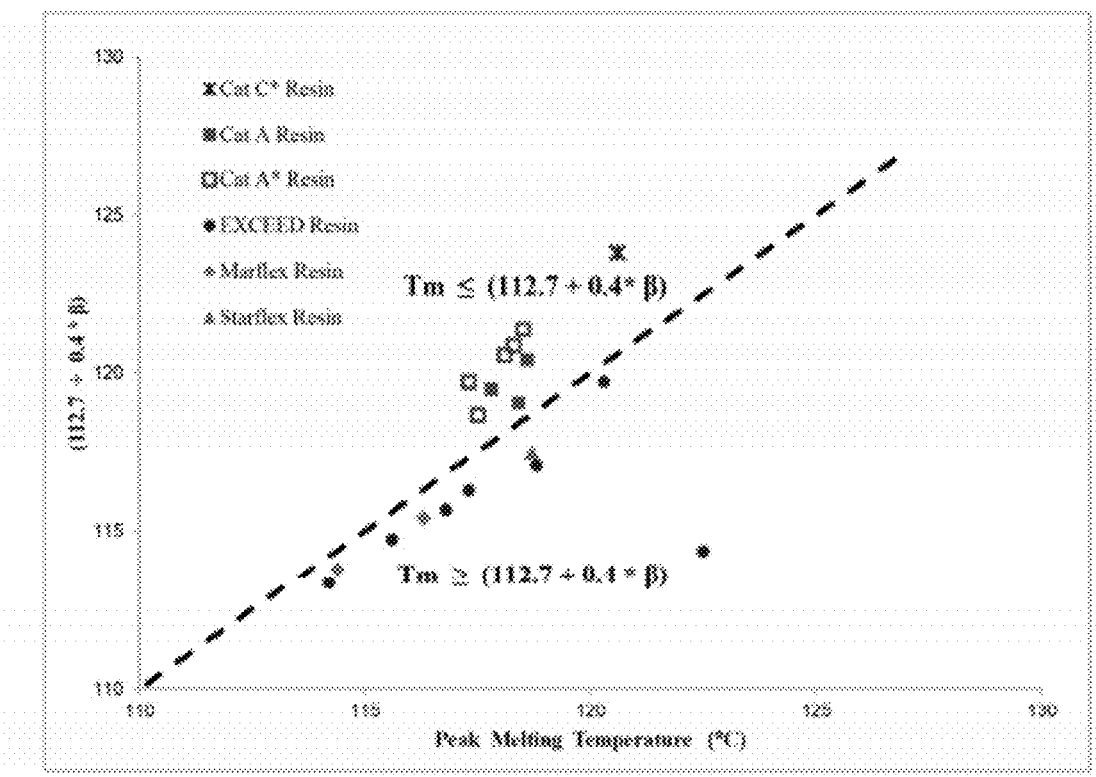
FIG. 2 is a plot of $(112.7+0.4\times\beta)$ vs Tm for polymer compositions used in the current invention and for comparative polymer compositions; Tm is the peak melting temperature in °C. as determined by DSC, and P is the amount in wt % of the copolymer that elutes at 90°C. and above as determined by TREF.

As further evidence that the copolymer compositions used in the present invention are distinct from commercially available EXCEED, Marflex and STARFLEX resins of similar density, FIG. 2 shows that in some embodiments, the copolymers of the present invention satisfy the condition: Tm≤ (112.7+0.4×β) where Tm is the peak melting temperature in ° C. as determined by DSC, and P is the amount in wt % of the copolymer that elutes at ≥90° C. as determined by TREF (method-B). The copolymers used in the current invention and shown in FIG. 2, all lie above the line and have a density range of between 0.9162 g/cc and 0.919 g/cc and a melt index $I_2$ range of between 0.85 and 2.2. The copolymers are made using either Catalyst A, Catalyst A* or Catalyst C* and satisfy the condition Tm≤(112.7+0.4×β). In contrast, none of the EXCEED 1018 comparative resins (the density ranged from 0.912 g/cc to 0.923 g/cc and the melt index, $I_2$ ranged from 1.0 to 4.5 g/10 min), or Marflex D139 (d=0.918 g/cc, $I_2$=0.88 g/10 min), Marflex D143 (d=0.916 g/cc, $I_2$=1.39 g/10 min) and STARFLEX (d=0.917 g/cc, $I_2$=0.90 g/10 min) comparative resins satisfied the condition: Tm≤(112.7+0.4×β); as is shown in FIG. 2.

The TREF profile (method-B) of resin having a density of 0.917 g/cc and made in the presence of the catalyst A is shown in FIG. 3. The TREF profile shows two well resolved, prominent peaks: a first peak has a maximum eluting at a lower temperature T1, and a second peak has a maximum eluting at a higher temperature T2. The first and second peaks have maxima at temperatures T1 and T2 which are separated by less than 20° C. The first peak maximum occurs at a temperature of between about 80 and about 90° C. The second peak maximum occurs at a temperature of above about 90° C. Deconvolution of the TREF profile showed that the about 14.9 wt % of the copolymer composition is represented at a temperature ≥90° C. The TREF profile also shows that there are no significant amounts of the copolymer eluting at a temperature of below about 40° C. The CDBI is 53.0%. Similar TREF profiles are obtained for copolymers B and C and the corresponding TREF data is included in Table 2.

As shown in Table 2, the TREF profiles for comparative resins EXCEED 1018CA™ show that about 11 wt % of the copolymer is represented at a temperature ≥90° C., while each of Marflex D139™ and Marflex D143™ have significant secondary peaks but at below 90° C. and which correspond to copolymer component amounts of less than 7 wt % at a temperature above 90° C. In embodiments of the invention, the copolymer composition (e.g. copolymers A and C) have a lower CDBI (i.e. less than 65%) at a similar molecular weight distributions and density relative to comparative resins EXCEED 1018CA, Marflex D139 and Marflex D143 (all of which are above 65%).

Each of the copolymers A, B, and C used in the present invention have a combination of very narrow molecular weight distribution and a broadened CDBI.

Film

The films of the current invention were made on a blown film line manufactured by Battenfeld Gloucester Engineering Company of Gloucester, Mass. using a die diameter of 4 inches, and a die gap of 35 or 100 mil. This blown film line has a standard output of more than 100 pounds per hour and is equipped with a 50 horsepower motor. Screw speed was 35 to 50 RPM. The extender screw has a 2.5 mil diameter and a length/diameter (L/D) ratio of 24/1. Melt Temperature and Frost Line Height (FLH) are 420 to 430° F. and 16 inches respectively. The blown film bubble is air cooled. Typical blow up ratio (BUR) for blown films prepared on this line are from 1.5/1 to 4/1. An annular die having a gap of 85 mils was used for these experiments. The films of this example were prepared using a BUR aiming point of 2.5:1 and a film thickness aiming point of 1.0 mils.

The film properties for invention and comparative films are reported in Table 3. Inventive Films A, B and C are made from copolymers A, B and C respectively. Comparative film D is made from commercially available EXCEED 1018CA™ resin. Comparative film E is made from commercially available Marflex D139™ resin. Comparative film F is made from commercially available Marflex D143™.

The haze (%) was measured in accordance with the procedures specified in ASTM D 1003-07, using a BYK-Gardner Haze Meter (Model Haze-gard plus).

Dart impact strength was measured on a dart impact tester (Model D2085AB/P) made by Kayeness Inc. in accordance with ASTM D-1709-04 (method A).

Machine (MD) and transverse (TD) direction Elmendorf tear strengths were measured on a ProTear™ Tear Tester made by Thwing-Albert Instrument Co. in accordance with ASTM D-1922.

Puncture resistance was measured on a MTS Systems Universal Tester (Model SMT2-500N-192) in accordance with ASTM D-5748

MD or TD Secant modulus was measured on an Instrument 5-Head Universal Tester (Model TTC-102) at a crosshead speed of 0.2 in/min up to 10% strain in accordance with ASTM D-882-10. The MD or TD secant modulus was determined by an initial slope of the stress-strain curve from an origin to 1% strain.

Film tensile testing was conducted on an Instrument 5-Head Universal Tester (Model TTC-102) in accordance with ASTM D-882-10.

Gloss was measured on a BYK-Gardner 45° Micro-Gloss unit in accordance with ASTM D2457-03.

A seal was prepared by clamping two 2.0 mil film strips between heated upper and lower seal bars on a SL-5 Sealer made by Lako Tool for 0.5 seconds, 40 psi seal bar clamping pressure for each temperature in the range from onset of seal to melt through. Seal strength or sealability parameter was measured as a function of seal temperature on an Instrumet 5-Head Universal Tester (Model TTC-102) in accordance with ASTM F88-09.

TABLE 3

Film Properties

| Inventive Film | Film-A[a] | Film-B[b] | Film-C[b] |
|---|---|---|---|
| film gauge (mils) | 1 | 1 | 1 |
| dart impact (g/mil) | 650 | 615 | 509 |
| puncture strength (J/mm) | 71 | 81.2 | 88 |
| MD tear (g/mil) | 257 | 290 | 279 |
| TD tear (g/mil) | 405 | 391 | 431 |
| 1% MD secant modulus (Mpa) | 137 | 144 | 166 |
| 1% TD secant modulus (MPa) | 166 | 139 | 165 |
| MD tensile strength (MPa) | 56.6 | 46.7 | 53.3 |
| TD tensile strength (MPa) | 41.0 | 46.8 | 45.5 |
| MD yield strength (MPa) | 9.1 | 9.3 | 9.2 |
| TD yield strength (MPa) | 9.2 | 7.8 | 9.7 |
| MD ultimate elongation (%) | 571 | 554 | 619 |
| TD ultimate elongation (%) | 654 | 741 | 698 |
| gloss at 45° (%) | 68 | 47.2 | 64 |
| haze (%) | 7.2 | 11.9 | 6.3 |
| sealability on 2.0 mil Films: | | | |
| seal initiation temp. (° C.) | 103 | — | — |
| max. cold seal strength (N) | 9.8 | — | — |
| temp. at max. seal strength (° C.) | 125 | — | — |
| spec. output (lb/amp-hr) | 2.381 | 1.988 | 2.020 |
| PPA additive (ppm) | 500 | 500 | 500 |
| Comparative Film | Film-D[a] | Film-E[a] | Film-F[a] |
| Film gauge (mil) | 1.0 | 1.0 | 1.0 |
| dart impact (g/mil) | 634 | 732 | 725 |
| puncture strength (J/mm) | 80 | 69 | 65 |

TABLE 3-continued

| Film Properties | | | |
|---|---|---|---|
| MD Tear (g/mil) | 247 | 236 | 238 |
| TD Tear (g/mil) | 354 | 376 | 347 |
| 1% MD Secant Modulus (MPa) | 169 | 130 | 120 |
| 1% TD Secant Modulus (MPa) | 177 | 172 | 132 |
| MD Tensile Strength (MPa) | 52.8 | 48.0 | 50.5 |
| TD Tensile Strength (MPa) | 52.2 | 42.9 | 50.2 |
| MD Yield Strength (MPa) | 9.8 | 8.7 | 7.9 |
| TD Yield Strength (MPa) | 9.9 | 9.1 | 7.7 |
| MD Ultimate Elongation (%) | 576 | 526 | 583 |
| TD Ultimate Elongation (%) | 723 | 653 | 712 |
| gloss @ 45° (%) | 43 | 85 | 83 |
| haze (%) | 15.3 | 3.7 | 4.0 |
| sealability on 2.0 mil films: | | | |
| seal initiation temp. (° C.) | N/A | 105 | 103 |
| max. cold seal strength (N) | N/A | 11.9 | 10.4 |
| temp. @ max. seal strength (° C.) | N/A | 125 | 125 |
| spec. output (lb/amp-hr) | 2.041 | 2.000 | 2.273 |
| additive (ppm) | NA | NA | NA |

N/A = not applicable or not measured
<sup>a</sup>Film-A, Film-D, Film-E and Film-F were run at 35 mil die gap
<sup>b</sup>Film-B and Film-C were run at 100 mil die gap The films of the present invention (inventive films A, B and C) are distinct from films made with commercially available EXCEED 1018CA™ (comparative film D), Marflex D139™ (comparative film E) and Marflex D143™ (comparative film F) resins of similar density. The data in Table 3 demonstrate that the films of the present invention have a good balance of mechanical, optical and processing properties. The films of the invention have better haze (i.e. ≤12%) than films made from Exceed 1018CA resin (i.e. 15.3%). The present films have better MD and TD tear strengths than any of the comparative films at more than 250 g/mil and 390 g/mil respectively. Also, the specific output of these resins are similar or slightly better than comparative commercial resins such a EXCEED and Marflex.

What is claimed is:

1. A film comprising a copolymer of ethylene and 1-hexene wherein the film has a haze of ≤12%, a dart impact of ≥500 g/mil, an MD tear of ≥200 g/mil and wherein the copolymer has a density of from 0.916 g/cc to 0.930 g/cc, a melt index ($I_2$) of from 0.3 to 3 g/10 min, a melt flow ratio ($I_{21}/I_2$)<20, a molecular weight distribution ($M_w/M_n$)≤2.5, and satisfies the condition:
CDBI≤(β+25)/a-parameter; where β is the amount in weight % of the copolymer that elutes at 90° C. and above as determined by TREF, CDBI is the comonomer distribution breadth index determined by TREF, and the a-parameter is the Carreau-Yasuda shear exponent as determined by DMA at 190° C.

2. The film of claim 1 wherein the copolymer satisfies the condition Tm≤(112.7+0.4×β) where Tm is the peak melting temperature in ° C. as determined by DSC, and β is the amount in wt % of the copolymer that elutes at 90° C. and above as determined by TREF.

3. The film of claim 1 wherein the copolymer has a density of from 0.917 g/cc to 0.920 g/cc.

4. The film of claim 1 wherein the copolymer has a melt flow ratio ($I_{21}/I_2$) of from 14 to 19.

5. The film of claim 1 wherein the copolymer has a CDBI of from 50% to 65%.

6. The film of claim 1 wherein the copolymer has a molecular weight distribution ($M_w/M_n$) of from 1.8 to 2.3.

7. The film of claim 1 wherein the copolymer has a hexane extractables of ≤0.5 wt %.

8. The film of claim 1 wherein the film has an MD tear >250 g/mil and a TD tear >380 g/mil.

9. The film of claim 1 wherein the film has a ratio of MD tear to TD tear (MD tear/TD tear) of from 0.50 to 0.85.

10. The film of claim 1 wherein the film has an MD secant modulus at 1% strain ≥130 Mpa and a TD secant modulus at 1% strain ≥135 Mpa.

11. The film of claim 1 wherein the film has a dart impact of ≥600 g/mil.

12. The film of claim 1 wherein the copolymer has a molecular weight distribution ($M_w/M_n$) of ≤2.1.

13. The film of claim 1 wherein the copolymer is made in a single gas phase reactor with a single polymerization catalyst comprising: an organometallic compound having a phosphinimine ligand; an alkylaluminoxane cocatalyst; and an inert support.

14. The film of claim 13 wherein the organometallic compound has the formula:
(1,2-($R^2$)(Ar—F)Cp)Ti(N═P(t-Bu)$_3$)$X_2$, where $R^2$ is an alkyl group, Ar—F is a perfluorinated aryl group, a 2,6 fluoro substituted phenyl group, a 2,4,6 fluoro substituted phenyl group or a 2,3,5,6 fluoro substituted phenyl group and X is an activatable ligand.

15. The film of claim 14 wherein the organometallic compound has the formula:
(1,2-($R^2$)($C_6F_5$)Cp)Ti(N═P(t-Bu)$_3$)$X_2$, where $R^2$ is n-propyl, n-butyl or n-hexyl; and where X is an activatable ligand.

16. A film exhibiting a haze of ≤12%, a dart impact of ≥500 g/mil, an MD tear of ≥200 g/mil wherein said film comprises a copolymer of ethylene and 1-hexene and which has a density of from 0.916 g/cc to 0.930 g/cc, an $I_{21}/I_2$<20, a Mw/Mn of ≤2.5 and which has a TREF profile comprising i) less than 5 wt % of the copolymer represented at a temperature at or below 40° C., ii) a primary peak at a temperature T1, iii) a secondary peak at a temperature T2, and iv) from 10 to 30 wt % of the copolymer is represented at a temperature of from 90° C. to 105 C.°; wherein T2>T1 and the temperature difference between T1 and T2 is less than 20° C.

17. The film of claim 16 wherein the temperature difference between T1 and T2 is less than 15° C.

18. The film of claim 16 wherein from 12 to 25 wt % of the copolymer is represented at a temperature from 90° C. to 105 C.°.

19. The film of claim 16 wherein T2 is greater than 90° C.

20. The film of claim 16 wherein T1 is in the range of from 75 to 90° C. and T2 is in the range of 85 to 100° C.

21. The film of claim 16 wherein T1 is in the range of from 80 to 90° C. and T2 is in the range of 90 to 100° C.

22. The film of claim 16 wherein the copolymer has a CDBI of from 50% to 65%.

23. The film of claim 16 wherein the copolymer has a density of from 0.917 g/cc to 0.920 g/cc.

24. The film of claim 16 wherein the copolymer has a molecular weight distribution (Mw/Mn) of ≤2.3.

25. The film of claim 16 wherein the film has a MD tear >250 g/mil and a TD tear >380 g/mil.

26. The film of claim 16 wherein the film has a ratio of MD tear to TD tear (MD tear/TD tear) of from 0.50 to 0.85.

27. The film of claim 16 wherein the film has a dart impact of ≥600 g/mil.

28. The film of claim 16 wherein the film has an MD secant modulus at 1% strain ≥130 Mpa and a TD secant modulus at 1% strain ≥135 Mpa.

29. The film of claim 16 wherein the copolymer is made in a single gas phase reactor with a single polymerization catalyst comprising: an organometallic compound having a phosphinimine ligand; an alkylaluminoxane cocatalyst; and an inert support.

30. The film of claim 29 wherein the organometallic compound has the formula:
   $(1,2\text{-}(R^2)(Ar\text{—}F)Cp)Ti(N\text{=}P(t\text{-}Bu)_3)X_2$, where $R^2$ is an alkyl group, Ar—F is a perfluorinated aryl group, a 2,6 fluoro substituted phenyl group, a 2,4,6 fluoro substituted phenyl group, or a 2,3,5,6 fluoro substituted phenyl group, and X is an activatable ligand.

31. The film of claim 30 wherein the organometallic compound has the formula:
   $(1,2\text{-}(R^2)(C_6F_5)Cp)Ti(N\text{=}P(t\text{-}Bu)_3)X_2$, where $R^2$ is n-propyl, n-butyl or n-hexyl; and where X is an activatable ligand.

32. A film comprising a copolymer of ethylene and 1-hexene wherein the film has a haze of ≤12%, a dart impact of ≥500 g/mil, an MD tear of ≥200 g/mil and wherein the copolymer has a density of from 0.916 g/cc to 0.930 g/cc, a melt index ($I_2$) of from 0.3 to 3 g/10 min, a melt flow ratio ($I_{21}/I_2$)<20, a molecular weight distribution ($M_w/M_n$)≤2.5, and satisfies the condition:
   Tm≤(112.7+0.4×β) where Tm is the peak melting temperature in ° C. as determined by DSC, and β is the amount in wt % of the copolymer that elutes at 90° C. and above as determined by TREF.

33. The film of claim 32 wherein the copolymer has a density of from 0.917 g/cc to 0.920 g/cc.

34. The film of claim 32 wherein the copolymer has a melt flow ratio ($I_{21}/I_2$) of from 14 to 19.

35. The film of claim 32 wherein the copolymer has a CDBI of from 50% to 65%.

36. The film of claim 32 wherein the copolymer has a molecular weight distribution ($M_w/M_n$) of from 1.8 to 2.3.

37. The film of claim 32 wherein the copolymer has a hexane extractables of ≤0.5 wt %.

38. The film of claim 32 wherein the film has an MD tear >250 g/mil and a TD tear >380 g/mil.

39. The film of claim 32 wherein the film has a ratio of MD tear to TD tear (MD tear/TD tear) of from 0.50 to 0.85.

40. The film of claim 32 wherein the film has an MD secant modulus at 1% strain ≥130 Mpa and a TD secant modulus at 1% strain ≥135 Mpa.

41. The film of claim 32 wherein the film has a dart impact of ≥600 g/mil.

42. The film of claim 32 wherein the copolymer has a molecular weight distribution ($M_w/M_n$) of ≤2.1.

43. The film of claim 32 wherein the copolymer is made in a single gas phase reactor with a single polymerization catalyst comprising: an organometallic compound having a phosphinimine ligand; an alkylaluminoxane cocatalyst; and an inert support.

44. The film of claim 43 wherein the organometallic compound has the formula:
   $(1,2\text{-}(R^2)(Ar\text{—}F)Cp)Ti(N\text{=}P(t\text{-}Bu)_3)X_2$, where $R^2$ is an alkyl group, Ar—F is a perfluorinated aryl group, a 2,6 fluoro substituted phenyl group, a 2,4,6 fluoro substituted phenyl group, or a 2,3,5,6 fluoro substituted phenyl group and X is an activatable ligand.

45. The film of claim 44 wherein the organometallic compound has the formula:
   $(1,2\text{-}(R^2)(C_6F_5)Cp)Ti(N\text{=}P(t\text{-}Bu)_3)X_2$, where $R^2$ is n-propyl, n-butyl or n-hexyl; and where X is an activatable ligand.

46. A film comprising a copolymer of ethylene and an alpha-olefin having from 3-10 carbon atoms wherein the film has a haze of ≤12%, a dart impact of ≥500 g/mil, an MD tear of ≥200 g/mil and wherein the copolymer is selected from a group consisting of copolymer (a), copolymer (b), and copolymer (c);
   wherein copolymer (a) has a density of from 0.917 g/cc to 0.920 g/cc, a melt index ($I_2$) of from 0.3 to 3 g/10 min, a melt flow ratio ($I_{21}/I_2$)<20, a molecular weight distribution ($M_w/M_n$)≤2.5, and satisfies the condition: CDBI≤ (β+25)/a-parameter;
   where β is the amount in weight % of the copolymer that elutes at 90° C. and above as determined by TREF, CDBI is the comonomer distribution breadth index determined by TREF, and the a-parameter is the Carreau-Yasuda shear exponent as determined by DMA at 190° C.;
   copolymer (b) has a density from 0.917 g/cc to 0.920 g/cc, an $I_{21}/I_2$<20, a Mw/Mn of ≤2.5 and which has a TREF profile comprising i) less than 5 wt % of the copolymer represented at a temperature at or below 40° C., ii) a primary peak at a temperature T1, iii) a secondary peak at a temperature T2, and iv) from 10 to 30 wt % of the copolymer is represented at a temperature of from 90° C. to 105 C.°;
   wherein T2>T1 and the temperature difference between T1 and T2 is less than 20° C.;
   and copolymer (c) has a density of from 0.917 g/cc to 0.920 g/cc, a melt index ($I_2$) of from 0.3 to 3 g/10 min, a melt flow ratio ($I_{21}/I_2$)<20, a molecular weight distribution ($M_w/M_n$)≤2.5, and satisfies the condition: Tm≤(112.7+ 0.4×β) where Tm is the peak melting temperature in ° C. as determined by DSC, and β is the amount in wt % of the copolymer that elutes at 90° C. and above as determined by TREF.

47. A film comprising a copolymer of ethylene and an alpha-olefin having from 3-10 carbon atoms wherein the film has a haze of ≤12%, a dart impact of ≥500 g/mil, an MD tear >250 g/mil, a TD tear >380 g/mil, and wherein the copolymer is selected from a group consisting of copolymer (a), copolymer (b), and copolymer (c);
   wherein copolymer (a) has a density of from 0.916 g/cc to 0.930 g/cc, a melt index ($I_2$) of from 0.3 to 3 g/10 min, a melt flow ratio ($I_{21}/I_2$)<20, a molecular weight distribution ($M_w/M_n$)≤2.5, and satisfies the condition: CDBI≤ (β+25)/a-parameter;
   where β is the amount in weight % of the copolymer that elutes at 90° C. and above as determined by TREF, CDBI is the comonomer distribution breadth index determined by TREF, and the a-parameter is the Carreau-Yasuda shear exponent as determined by DMA at 190° C.;
   copolymer (b) has a density of from 0.916 g/cc to 0.930 g/cc, an $I_{21}/I_2$<20, a Mw/Mn of ≤2.5 and which has a TREF profile comprising i) less than 5 wt % of the copolymer represented at a temperature at or below 40° C., ii) a primary peak at a temperature T1, iii) a secondary peak at a temperature T2, and iv) from 10 to 30 wt % of the copolymer is represented at a temperature of from 90° C. to 105 C.°;
   wherein T2>T1 and the temperature difference between T1 and T2 is less than 20° C.;
   and copolymer (c) has a density of from 0.916 g/cc to 0.930 g/cc, a melt index ($I_2$) of from 0.3 to 3 g/10 min, a melt flow ratio ($I_{21}/I_2$)<20, a molecular weight distribution ($M_w/M_n$)≤2.5, and satisfies the condition: Tm≤(112.7+ 0.4×β) where Tm is the peak melting temperature in ° C. as determined by DSC, and β is the amount in wt % of the copolymer that elutes at 90° C. and above as determined by TREF.

* * * * *